(12) United States Patent
Roy et al.

(10) Patent No.: US 10,038,746 B2
(45) Date of Patent: *Jul. 31, 2018

(54) METHOD AND SYSTEM FOR CO-BROWSING IN A B2C2C CO-BROWSE ARCHITECTURE THROUGH CO-BROWSING FUNCTIONALITY EMBEDDED IN CONTENT OF A CONTENT PROVIDER AS INITIATED BY A HOST TO A CO-BROWSE SESSION

(71) Applicant: eGain Communications Corporation, Mountain View, CA (US)

(72) Inventors: Ashutosh Roy, Los Altos, CA (US); Sam Hahn, Saratoga, CA (US)

(73) Assignee: eGain Corporation, Sunnyvale, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 14/475,221

(22) Filed: Sep. 2, 2014

(65) Prior Publication Data

US 2015/0067180 A1 Mar. 5, 2015

Related U.S. Application Data

(60) Provisional application No. 61/872,630, filed on Aug. 30, 2013.

(51) Int. Cl.
*G06F 15/16* (2006.01)
*H04L 29/08* (2006.01)
(Continued)

(52) U.S. Cl.
CPC ........ *H04L 67/1095* (2013.01); *G06F 3/1454* (2013.01); *H04L 12/1813* (2013.01);
(Continued)

(58) Field of Classification Search
CPC ........... G06F 9/45512; G06F 17/30873; G06F 17/30899; G06F 3/038; G06F 3/1454; H04L 67/02; H04L 67/42; H04W 4/60
(Continued)

(56) References Cited

U.S. PATENT DOCUMENTS 7,277,408 B2 * 10/2007 Sorsa ................. H04L 67/42
370/328
8,010,901 B1 * 8/2011 Rogers ............ G06F 17/30873
709/204

(Continued)

*Primary Examiner* — Dustin Nguyen

(57) ABSTRACT

A method for co-browsing includes establishing a communication session between a first web browser and a content provider to deliver content, wherein the content comprises embedded co-browsing functionality. A request is received for activating the co-browsing functionality. A second communication session is established between the web browser of a first device and a co-browse communication server to initiate a co-browse session, wherein the first device acts as a host. A third communication session is established between a second web browser and the co-browse communication server to join the second web browser into the co-browse session based on the co-browse session identifier. The co-browse session is established between the first web browser as host and the second web browser of said second device as guest, such that the content at the first web browser is delivered to the second web browser via the co-browse communication sever over the co-browse session.

20 Claims, 12 Drawing Sheets

(51) Int. Cl.
*H04L 12/18* (2006.01)
*G06F 3/14* (2006.01)

(52) U.S. Cl.
CPC .......... *H04L 12/1822* (2013.01); *H04L 67/02* (2013.01); *H04L 67/141* (2013.01); *H04L 67/148* (2013.01)

(58) Field of Classification Search
USPC .................. 709/204, 206; 715/738, 748, 753
See application file for complete search history.

(56) References Cited

U.S. PATENT DOCUMENTS

| | | | | |
|---|---|---|---|---|
| 2004/0225716 | A1* | 11/2004 | Shamir | G06F 17/30873 709/204 |
| 2008/0016155 | A1* | 1/2008 | Khalatian | G06F 3/038 709/204 |
| 2008/0276183 | A1* | 11/2008 | Siegrist | G06F 9/45512 715/748 |
| 2010/0250755 | A1* | 9/2010 | Morris | G06F 17/30899 709/228 |
| 2011/0289155 | A1* | 11/2011 | Pirnazar | G06F 17/30873 709/206 |
| 2012/0005567 | A1* | 1/2012 | Burckart | G06F 3/1454 715/234 |
| 2012/0047449 | A1* | 2/2012 | Burckart | G06F 17/30899 715/753 |
| 2014/0019534 | A1* | 1/2014 | Handrigan | G06F 17/30873 709/204 |
| 2014/0098176 | A1* | 4/2014 | Isaacs | H04W 4/60 348/14.01 |
| 2014/0195588 | A1* | 7/2014 | Badge | H04L 67/02 709/203 |
| 2015/0067060 | A1 | 3/2015 | Roy et al. | |
| 2015/0067181 | A1 | 3/2015 | Roy et al. | |
| 2015/0149916 | A1* | 5/2015 | Mendez | G06F 17/30873 715/738 |

* cited by examiner

METHOD AND SYSTEM FOR CO-BROWSING IN A B2C2C CO-BROWSE ARCHITECTURE THROUGH CO-BROWSING FUNCTIONALITY EMBEDDED IN CONTENT OF A CONTENT PROVIDER AS INITIATED BY A HOST TO A CO-BROWSE SESSION

CROSS REFERENCE TO RELATED APPLICATIONS

This present application claims priority to and the benefit of the commonly owned, provisional patent application, U.S. Ser. No. 61/872,630, entitled "METHOD AND SYSTEM FOR CO-BROWSING," with filing date Aug. 30, 2013, which is herein incorporated by reference in its entirety.

BACKGROUND

Co-browsing allows at least two participating parties to view substantially the same content that is deliverable through a network. For example, co-browsing provides a way for two participants to have a personal shopping experience while online, such that it simulates the experience of physical shopping. The two participants may also have a separate phone connection that allows both to comment on products viewed through the co-browsing session.

In the past, a proxy server acts as an intermediary source of web content deliverable to both participants in the co-browsing session. For example, the proxy server receives content from a web site, and then forwards the content to each of the participants in the co-browsing session. Because the content is sourced at the proxy server, the proxy server is able to deliver the same content to each of the participants.

One of the issues with having a proxy server as an intermediate source of content is that if there are problems at the proxy server, then both connections to the participants will suffer. For example, if the connection between the content provider and the proxy server goes down, then both participants will also cease receiving data. In another example, if the proxy server is experiencing difficulties in processing the content and formatting it for delivering the co-browsing session, then both participants will also experience those difficulties, such as, delays in inputting and/or receiving information, poor response times, poor quality of multimedia (e.g., data, video, audio), and more. These difficulties experienced at the proxy server will be experienced by the participants.

What is needed is a co-browsing architecture that allows for a co-browsing experience that is seamless with an original browsing session.

SUMMARY

A method for co-browsing, such as, between a business and a customer, in one embodiment. The method includes establishing a first communication session between a first web browser of first device (e.g., of the customer) and a content provider (e.g., business) over a network to deliver content to the first web browser from the content provider. The first device is associated with a first user. In addition, the content includes embedded co-browsing functionality that allows for co-browsing between two or more parties. The method includes establishing a second communication session between a second device (e.g., agent of the business) and a co-browse communication server to initiate a co-browse session, wherein the co-browse session comprises a co-browse session identifier, and wherein the second device acts as a guest in the co-browse session. The method includes sending a user identifier associated with the first user and the co-browse session identifier from the second device to the content provider. The method includes exposing the co-browsing functionality in the content delivered to the first web browser with an icon comprising the co-browse session identifier, such that when the icon is activated at the first device, the first web browser is joined into the co-browse session. The method includes establishing the co-browse session between the first web browser of the first device as a host and a second web browser of the second device, such that the content at the first web browser is delivered to the second web browser of the second device via the co-browse communication server through the co-browse session A system for co-browsing, such as, between a business and a customer, is described in another embodiment. The system includes a first device including a first web browser for communicating over a network, wherein the first device is associated with a first user. A content provider provides content, wherein the content includes embedded co-browsing functionality that allows for co-browsing between two or more parties. A first communication session between the first web browser of the first device and the content provider over the network delivers content to the first web browser from the content provider. A second device including a second web browser communicates over the network. A co-browse communication server provides a co-browse session comprising a co-browse session identifier. A second communication session between the second device and the co-browse communication server initiates the co-browse session, wherein the second device acts as a guest in the co-browse session. A third communication session between the second device and the content provider delivers the user identifier and the co-browse session identifier to the content provider. The co-browsing functionality in the content delivered to the first web browser is exposed with an icon comprising the co-browse session identifier, such that when the icon is activated at the first device, the first web browser is joined into the co-browse session. The co-browse session is established between the first web browser of the first device as a host and a second web browser of the second device, such that the content at the first web browser is delivered to the second web browser of the second device via the co-browse communication server through the co-browse session A method for co-browsing, such as between two customers of a business, in one embodiment. The method includes establishing a first communication session between a first web browser of first device (e.g., of a first customer) and a content provider over a network to deliver content to the first web browser from the content provider, wherein the content comprises embedded co-browsing functionality allowing co-browsing between two or more parties. The method includes receiving a request for activating the co-browsing functionality at the first device. The method includes establishing a second communication session between the first web browser and a co-browse communication server to initiate a co-browse session, wherein the co-browse session comprises a co-browse session identifier, wherein the first device acts as a host in the co-browse session. The method includes establishing a third communication session between a second web browser of a second device (e.g., a second customer) and the co-browse communication server to join the second web browser into the co-browse session based on the co-browse session identifier. The method includes establishing the co-browse session between the first web browser as the host and the second web browser of the second device as a guest, such that the content at the first web browser is delivered to the second web browser via the co-browse communication sever over the co-browse session.

A system for co-browsing, such as between two customers of a business, in one embodiment. The system includes a first device comprising a first web browser for communicating over a network. A content provider provides content including embedded co-browsing functionality allowing co-browsing between two or more parties. A first communication session between the first web browser and the content provider over the network delivers the content to the first web browser from the content provider. A second device including a second web browser communicates over the network. A co-browse communication server provides a co-browse session including a co-browse session identifier. A second communication session established between the first web browser and the co-browse communication server initiates the co-browse session including a co-browse session identifier, wherein the second communication session is established in response to receiving a request for activating the co-browse functionality at the first device, wherein the first device acts as a host in the co-browse session. A third communication session established between the second web browser and the co-browse communication server joins the second web browser into the co-browse session based on the co-browse session identifier. Wherein the co-browse session is established between the first web browser as the host and the second web browser of the second device as a guest, such that the content at the first web browser is delivered to the second web browser via the co-browse communication sever over the co-browse session.

A method for co-browsing between multiple parties is described in embodiments. The method includes establishing a first communication session between a first web browser of first device and a first content provider over a network to deliver content to the first web browser from the first content provider. The method includes accessing a co-browse extension on the first web browser to enable multi-domain co-browsing functionality on the first web browser. The method includes establishing a second communication session between the first web browser and a co-browse communication server to initiate and join the first web browser in a co-browse session, wherein the co-browse session comprises a co-browse session identifier, wherein the first device acts as a host in the co-browse session. The method includes establishing a third communication session between a second web browser of a second device and the co-browse communication server to join the second web browser into the co-browse session, such that content at the first web browser is delivered to the second web browser of the second device via the co-browse communication server.

A system for co-browsing between multiple parties is described in embodiments. The system includes a first communication session established between a first web browser of first device and a first content provider over a network to deliver content to the first web browser from the first content provider. A co-browse extension accessible on the first web browser that enables multi-domain co-browsing functionality on the first web browser. A second communication session established between the first web browser and a co-browse communication server initiates and joins the first web browser in a co-browse session, wherein the co-browse session includes a co-browse session identifier, wherein the first device acts as a host in the co-browse session. A third communication session between a second web browser of a second device and the co-browse communication server joins the second web browser into the co-browse session, such that content at the first web browser is delivered to the second web browser of the second device via the co-browse communication server.

A method is described for inviting a guest into a co-browse session, wherein the guest is logged into a network. In particular, on the host side, within the browser, a small extension is installed to enable co-browsing via the communication server facilitating co-browsing, and invite one or more guests that are logged into a network. The log-in may be on any supported and verifiable website, such as, a third party social network, or an insurance company network, or even the website/service that provides co-browsing services. For example, both the host and the guest are logged into the network supporting the co-browsing, and as such, both are identified to each other. In the case of a guest that is logged into a third party social networking site, the host is able to select a friend, invite that friend through the third party social network communications platform (e.g., Facebook message on that friend's wall), and establish a co-browsing session upon acceptance of the invite. More particularly, the extension provides for the display of a small co-browsing widget, for example. In order to commence co-browsing, the host first logs into the system. The host then enters a guest identification field. Since the guest is logged in, an identification of the guest can be found using the guest's log-in information. Once selected, a small message with session number is displayed on the guest's computer display (e.g., through a messaging board) and through the network upon which the guest is logged-in. When the session number is selected, the co-browsing session is established.

A method for establishing a co-browse session is described, wherein the guest is not logged into any site identifiable by the co-browse session, in accordance with one embodiment of the present disclosure. On the host side, within the browser, a small extension is installed to enable co-browsing via the co-browse communication server facilitating the co-browsing session, as previously described. In another implementation, the functionality is provided at the .com website, as previously described. This extension provides for the display of a small co-browsing widget. In order to commence co-browsing, the user or host first logs into the system. To invite another user to join, the host then enters information into a guest identification field selectable through interface 1030. The user can enter a guest identification and a communication method (e.g., email, token, etc.) to the guest. In one example, the guest is identified via an email address. The email address is used to send the guest an email which contains a session key. Upon the guest selecting the session key, a co-browsing session is started between the host and guest. The guest need not have the extension installed on the guest browser. Aside from email, the guest can be contacted via other communication methods, e.g., on-line chat, phone, etc. In addition, no native application need be installed on the guest computer.

In another embodiment, a method for co-browsing in a mobile environment is described. The method includes providing a mobile application executable on a mobile device, wherein the mobile application comprises a co-browsing functionality; and wrapping browser functionality with the mobile application, such that web browsing is enabled when executing the co-browsing functionality. For example, the browser functionality may be accessed within a library of functionalities, such that the method includes providing a library of functionalities comprising a first functionality enabling browser functionality; and calling the first functionality within the mobile application.

In still another embodiment, a method for displaying multiple pointers in a co-browsing environment is described. The method includes establishing a co-browse session between a host device and one or more guest devices. The method includes displaying a local pointer on a local device. The method includes displaying a remote pointer on the local device, wherein the remote pointer is associated with a device remote from the local device, and includes one or more features distinguishing the remote pointer from the local pointer.

In another embodiment, a method of co-browsing is described. The method includes providing a first user interface viewable on a display of a device. The method includes providing one or more widgets providing co-browsing functionalities. For instance, the method includes providing a widget in the user interface on a host device enabling an initiation of a co-browse session between a host and at least one guest.

In still another embodiment, a method of co-browsing is described, wherein the method includes establishing a co-browse session between a host device and one or more guest devices. The method includes accessing a first page from a first web site on the co-browse session. The method includes capturing a first snapshot of the first page. The method includes storing the first snapshot in a repository associated with a user of the host device.

These and other objects and advantages of the various embodiments of the present disclosure will be recognized by those of ordinary skill in the art after reading the following detailed description of the embodiments that are illustrated in the various drawing figures.

BRIEF DESCRIPTION

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
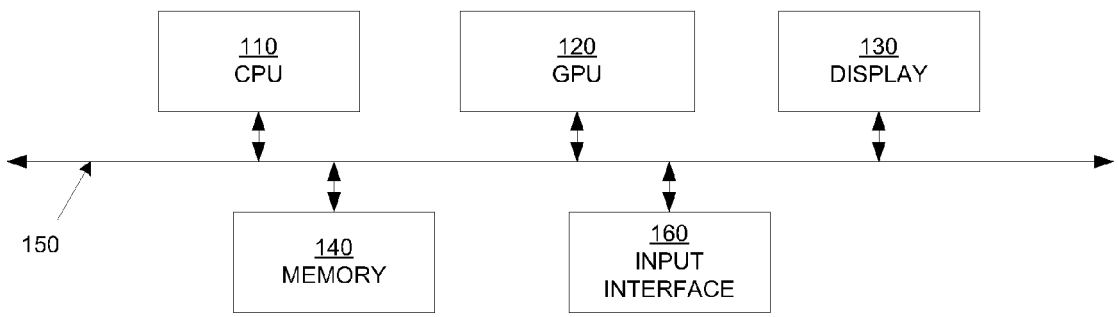
FIG. 1 depicts a block diagram of an exemplary computer system suitable for implementing the present methods, in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "browsing," "co-browsing," or the like, refer to actions and processes of a computer system or similar electronic computing device or processor (e.g., system 100). The computer system or similar electronic computing device manipulates and transforms data represented as physical (electronic) quantities within the computer system memories, registers or other such information storage, transmission or display devices.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data that drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Accordingly, embodiments of the present invention provide for co-browsing using various architectures, wherein the co-browsing functionality is embedded in content of a content provider and/or included in an extension to a browser used by one of the participants in a co-browse session.

Co-browsing of online content is implemented through various architectures. For instance, a business-to-customer (B2C) architecture provides for co-browsing of online content hosted by a participating web site between a customer and an agent of the web site, wherein the co-browsing functionality is embedded within content provided by a participating content provider, and wherein the agent acting as a guest initiates the co-browse session. A business-to-customer-to-customer (B2C2C) architecture provides for co-browsing of online content hosted by a participating web site between multiple participants, wherein the co-browsing functionality is embedded within content provided by a participating content provider, and wherein one participant acting as a host initiates the co-browse session. A customer-to-customer (C2C) architecture provides for co-browsing of online content between a one or more participants with only the participant acting as a host having an extension to their web browser configured for implementing co-browsing.

Figure 2:
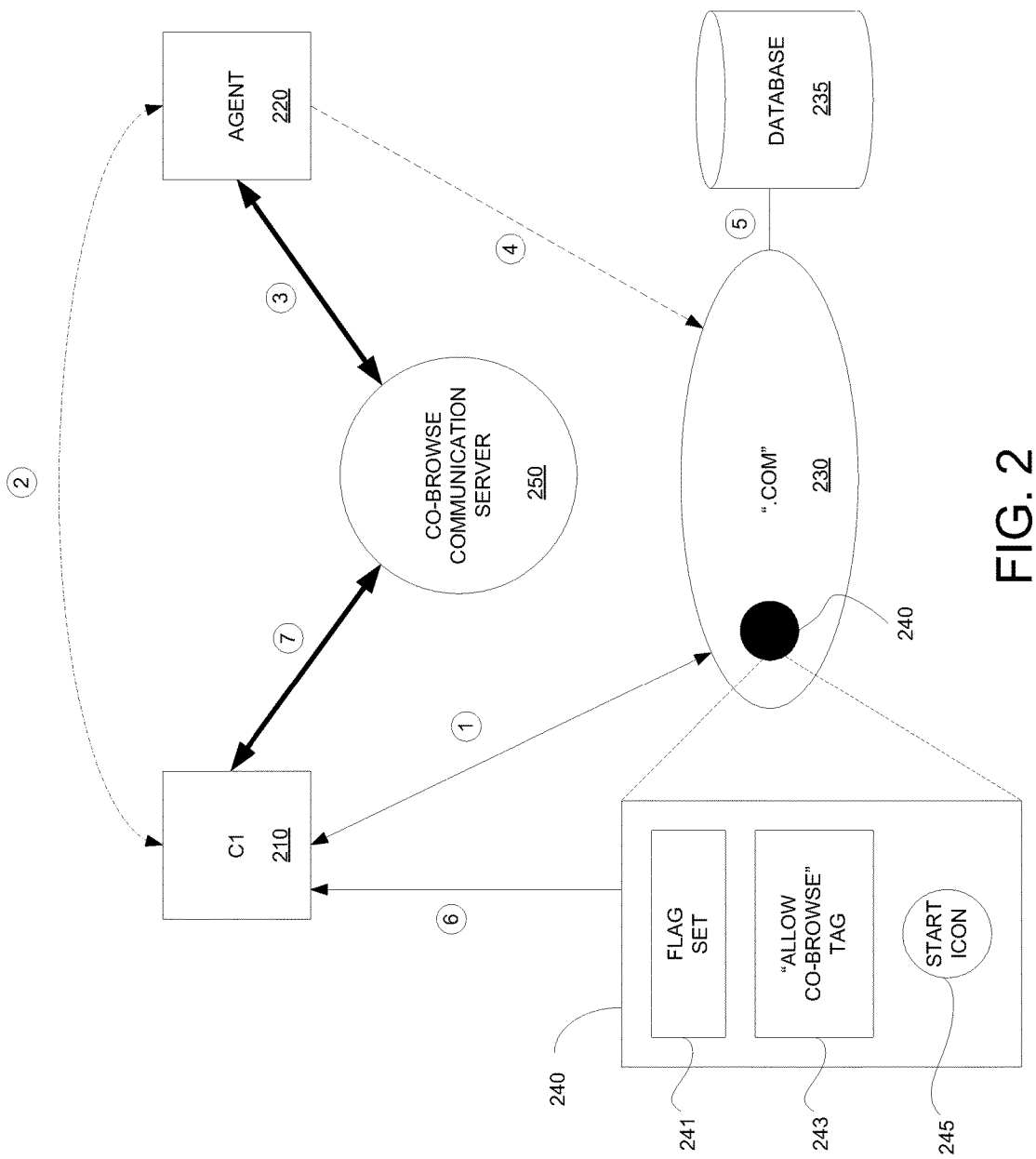
FIG. 2 is an illustration of an information flow diagram showing the flow of information through a co-browse system that is capable of establishing a co-browse session between two parties (e.g., a customer and an agent of a business) through co-browsing functionality embedded in content provided by a content provider, in accordance with one embodiment of the present disclosure.

B2C Architecture with Co-Browsing Functionality Embedded in Online Content, and where the Guest Initiates the Co-Browsing Session FIG. 2 is an illustration of an information flow diagram showing the flow of information through a co-browse system 200 that is capable of establishing a co-browse session between two parties (e.g., a customer and an agent of a business) through co-browsing functionality embedded in content provided by a content provider, in accordance with one embodiment of the present disclosure. System 200 illustrates a B2C architecture that provides for co-browsing of online content hosted by a content provider (referred to as ".com") between a customer C1 210 and an agent 220 of the content provider (e.g., business), wherein the co-browse session is initiated by the guest agent 220, and wherein the customer C1 210 acts as the host of the co-browse session.

For instance, a co-browsing session may be established between a web browser running on a computer system associated with customer C1 210, and a web browser running on a computer system associated with agent 220 that is affiliated with the business associated with .com server 230. The co-browsing session allows the two browsers to display substantially the same online content (e.g., an html web page), with some modifications for co-browsing depending on whether it is the host or the guest. In this embodiment, no extension application to any web browser is added to either of the computer systems associated with the customer C1 210 or the agent 220 used for facilitating the co-browsing session.

A use case for the B2C architecture may involve an insurance company and a customer, wherein the customer is trying to navigate through the insurance company's web site. For instance, the customer may be trying to fill out an accident form through the web site. The customer is already logged onto the insurance company's web site. The customer may encounter some problems filling out the form, and may initiate secondary communication (e.g., voice or chat) with the agent of the insurance company. The agent is able to initiate a co-browse session, through which the agent is able to help the customer fill out the form.

As shown in FIG. 2, a communication session is established between the customer C1 210 and the .com server 230 in step 1, wherein server 230 instantiates the .com website in order to provide content. For instance, the browser at C1 210 is able to receive content from .com server 230, wherein the content includes embedded co-browsing functionality (e.g., html, JavaScript, cascading style sheets [CSS], etc.) that is enabled when activated. For example, the online content includes code, images, video, or other content related to a web page. Access to the content is accomplished through some communication network (not shown), such as, the internet. When the content is delivered to C1 210, the co-browsing functionality is enabled at the appropriate time to facilitate co-browsing between C1 210 and the agent 220.

As previously described, the customer may enlist the help of the agent to help navigate through the content provided by .com server 230, at step 2. This help may be implemented through a secondary communication session, such as, a voice channel, a chat channel, etc. Through the secondary channel, C1 210 is also able to inform the agent of various forms of identifying information, such as a user name known or discoverable by the .com server 230. When the agent determines that a co-browse session would be helpful, the agent initiates a co-browse session at step 3 with the co-browse communication server 250, wherein the agent initiator acts as the guest in the co-browse session because C1 210 as host already has a browser session with .com 230. After the co-browse session is initiated and established, the co-browse communication server 250 sends back the co-browse session identifier to agent 220.

At step 4, the agent 220 delivers the co-browse session identifier to .com server 230, along with user identifier information. Because the customer C1 210 is logged onto .com server 230, the user identifier information is parsed and cross-referenced with information in database 235 (e.g., user profile and session identifiers) to determine the browser session established between C1 210 and the co-browse communication server 250 at step 5.

At step 6 and after determining which session is established between C1 210 and .com server 230, the .com server 230 is able to enable the co-browsing functionality in the content delivered to C1 120. For example, a flag 241 is set that now exposes a start icon 245 or hyperlink within the content. In one embodiment, the co-browse functionality is embedded in the content through an "allow co-browse" tag 243 (e.g., html, JavaScript, cascading style sheets [CSS], etc.).

At step 7, when the start icon 245 is activated, the web browser at C1 210 is directed to the co-browse communication server 250 in order to join C1 210 into the existing co-browse session.

For instance, the start icon 245 includes a link to the co-browse communication server 250. By instantiating the link through the activation of the start icon 245, the co-browse session is established, such that the co-browse session couples the browser of C1 210 to the communication server 250 through a communication network, and couples the web browser at agent 220 to the co-browse communication server 250. In another embodiment, the hyperlink is associated with some icon or widget that is provided on every page of the online content from .com 230. Clicking on the icon or hyperlink joins C1 210 into the co-browse session through the communication server 250.

In this co-browse session, the communication server 250 acts as an interface between the web browsers for C1 210 and the agent 220. In addition, the co-browsing functionality is embedded within the content delivered to both C1 210 and agent 220. As long as both are displaying content from .com server 230, the co-browse functionality is executing and the co-browse session remains live. As such, neither C1 210 or agent 220 needs an extension implementing co-browsing on their corresponding browsers, since the co-browsing functionality is embedded into the content provided by the .com server 230.

In addition, in the co-browse session whatever online content provided to the browser for C1 210 by .com server 230 is forwarded to the communication server 250, and then delivered to the browser for the agent 220. In this manner, the browser for the agent 220 is insulated from .com server 230, and relays all communication with .com server 230 through the communication server 250 and the browser for C1 210. Further, control (e.g., cursor click) or navigation information (e.g., cursor position and interaction) depending on priority and/or rules settings as implemented at C1 210 is relayed to the communication server 250, and to the agent 220.

In addition, any action on the online content as interfaced by the browser for the agent 220 is not directly delivered to the .com server 230, and instead is delivered to the communication server 250, which then delivers the interaction instruction to the browser of C1 210. At that point, the browser of C1 210 will deliver the interaction instruction to the .com server 230. In that manner, the instruction comes from the browser at C1 210, though it originated from the browser at agent 220. Further, any control (e.g., cursor click) or navigation information (e.g., cursor position and interaction) as interfaced by browser at agent 220, which depending on priority and/or rules settings implemented at agent 220, is then relayed to .com server 230.

In some embodiments, the communication server and/or the agent establishes a communication link back to the .com website for synchronizing the online content appearing on the displays for C1 and the agent.

Again, if the communication server malfunctions, then the communication session between the browser of C1 210 and the .com server 230 is unaffected. That is, only the link between the browser at the agent and the communication server will be affected (e.g., go down).

Figure 3A:
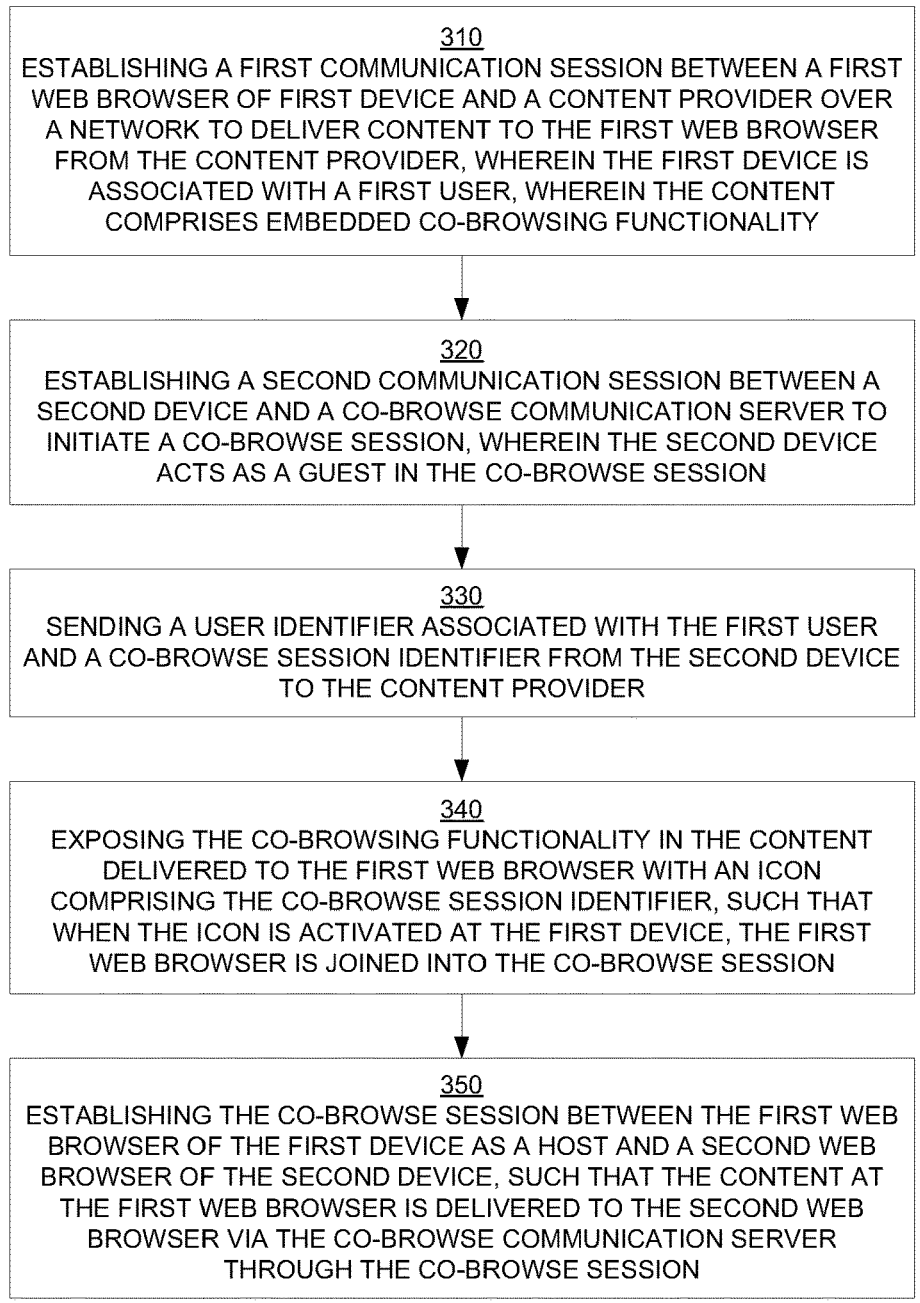
FIG. 3A is a flow diagram illustrating steps in a method for providing co-browsing between two parties through co-browsing functionality embedded in content provided by a content provider, in accordance with one embodiment of the present disclosure.

FIG. 3A is a flow diagram 300A illustrating steps in a method for providing co-browsing between two parties through co-browsing functionality embedded in content provided by a content provider, in accordance with one embodiment of the present disclosure. In other embodiments, all or portions of the method outlined in flow diagram 300A may be implemented as a computer-implemented method; or implemented as instructions within a computer system including a processor and memory configured to execute the instructions; or implemented as computer/processor executable instructions stored on a non-transitory computer-readable storage medium. Some or all of the operations performed in diagram 300A are implementable within apparatus 100 and/or co-browse system 200 of FIG. 2.

At 310, the method includes establishing a first communication session between a first web browser of first device (e.g., a customer) and a content provider (e.g., a business and/or .com server) over a communication network. The session is established to deliver content to the first web browser from the content provider, wherein the content is embedded with co-browsing functionality (e.g., html, JavaScript, CSS, etc.). The first device is associated with a first user. In one embodiment, the first user is logged into the content provider, such that the first user is authenticated through a log-in process and the first user is associated with the user identifier. In that manner, the first communication session is discoverable by cross referencing the user identifier.

At 320, the method includes establishing a second communication session between a second device (e.g., agent of the business) and a co-browse communication server to initiate a co-browse session, wherein the co-browse session comprises a co-browse session identifier. For instance, in the example previously given, the customer is enlisting the help of an agent to help navigate through a form provided by a web page as content through a co-browse session. This may occur through a secondary communication channel (e.g., chat or voice), wherein the customer may relay user identifying information to the agent). That is, a fourth communication session is established between the first user and a second user of the second device, wherein the user identifier of the first user is communicated and/or delivered to the second user through the fourth communication session. In this particular case, the second device acts as a guest in the co-browse session even though the second device initiates the co-browse session. In most cases, it is the host that already has the browser session with the content provider over which content is delivered.

When the co-browse session is established, the co-browse communication server delivers the co-browse session identifier to the second device (e.g., agent). In that manner, the session identifier can be used to join other participants. For example, at 330, the method includes sending a user identifier, associated with the first user, and the co-browse session identifier from the second device to the content provider. The user identifier may be a user name known or discoverable by the content provider. The content provider can then use that user identifier to cross reference and discover the first communication session delivering content to the first web browser associated with the first user.

Once that browser session is identified, content delivered to the first web browser may be modified to enable the co-browsing functionality. In particular, at 340, the method includes exposing the co-browsing functionality in the content delivered to the first web browser with an icon comprising the co-browse session identifier, such that when the icon is activated at the first device, the first web browser is joined into the co-browse session initiated by the second device (e.g., agent). The first communication session can be identified at the content provider based on the previously received user identifier, such as, through cross-referencing information in the database maintained by the content provider. Once the session is identified, its corresponding content can be accessed in order to enable the co-browsing functionality. As previously described, the co-browsing functionality is embedded in the content delivered to the first web browser, and enabled (e.g., by setting a flag), thereby exposing the co-browse functionality (e.g., through a start icon, or hyperlink, etc.). In one implementation, a new page is generated for the content, wherein the new page has the co-browse functionality enabled and includes the start icon. The new page is delivered as content to the first web browser.

At 350, the method includes establishing the co-browse session between the first web browser of the first device as a host and a second web browser of the second device, such that content at the first web browser is delivered to the second web browser of the second device via the co-browse communication server through the co-browse session. For example, a document object model (DOM) of the content is accessed at the first web browser, and the DOM is delivered to the co-browse communication server for delivery to the second web browser. In that manner, the co-browse session allows the two browsers to display substantially the same online content (e.g., an web page comprising html, JavaScript, CSS, etc.), with some modifications for co-browsing depending on control and priority information as defined for the host or the guest. For instance, changes to the DOM are recognized at one of the web browsers of the first and second devices. The changes may include events (e.g., mouse/cursor movement, mouse clicks, etc.). These changes are updated in the DOM, wherein the updated DOM is delivered to the other web server through the co-browse communication server.

More particularly, the second web browser is joined into the co-browse session to establish the co-browse session based on the co-browse session identifier. For instance, the method includes determining that the icon is activated at the first device, thereby indicating that the first user is requesting to join the co-browse session, in this case as the host. A third communication session is established between the first web browser and the co-browse communication server, such as, through the hyperlink that is instantiated by activating the start icon. Because the start icon includes the co-browse session identifier, that identifier is delivered from the first web browser to the co-browse communication server in a request to join the co-browse session. The communication server then joins the first web browser into the co-browse session based on the co-browse session identifier.

In one embodiment, a rules engine is established at the first device. In one implementation, the rules engine filters out sensitive information, such that it is prevented from being delivered to the co-browse communication server, and ultimately to the second web browser at the second device. For example, the customer at the first device may enter in a sensitive banking information in the form provided by the .com server. Because the first device acts as the host, that sensitive information would need to be ultimately delivered to the .com server for processing; however, the sensitive information may be not needed by the second user (e.g., agent) at the second device. To prevent fraud, that sensitive information is identified and prevented from being delivered to the co-browse communication server.

Figure 3B:
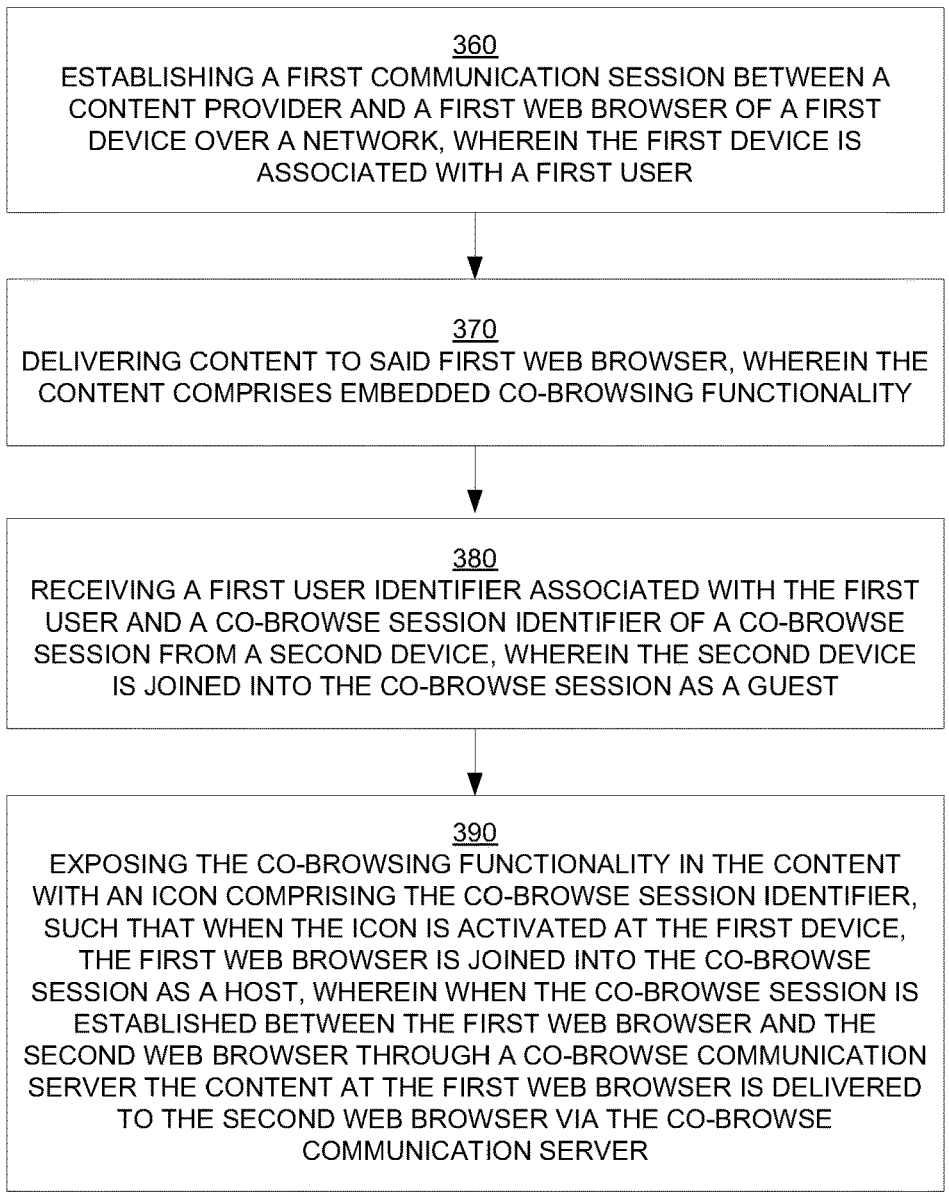
FIG. 3B is a flow diagram illustrating steps in a method for providing co-browsing between two parties by a participating content provider, and more specifically though co-browsing functionality embedded in content provided by the content provider, in accordance with one embodiment of the present disclosure.

FIG. 3B is a flow diagram 300B illustrating steps in a method for providing co-browsing between two parties by a participating content provider, and more specifically though co-browsing functionality embedded in content provided by the content provider, in accordance with one embodiment of the present disclosure. In other embodiments, the method outlined in flow diagram 300B may be implemented as a computer-implemented method; or implemented as instructions within a computer system including a processor and memory configured to execute the instructions; or implemented as computer/processor executable instructions stored on a non-transitory computer-readable storage medium. Some or all of the operations performed in diagram 300A are implementable within apparatus 100 and/or co-browse system 200 of FIG. 2.

At 360, the method includes establishing a first communication session between a content provider (e.g., a business and/or .com server) and a first web browser of first device (e.g., a customer) over a communication network. The session is established to deliver content to the first web browser from the content provider, wherein the content is embedded with co-browsing functionality (e.g., html, JavaScript, CSS, etc.). The first device is associated with a first user.

At 370, the method includes delivering content to the first web browser, wherein the content comprises embedded co-browsing functionality (e.g., html, JavaScript, CSS, etc.).

At 380, the method includes receiving a first user identifier associated with the first user and a co-browse session identifier of a co-browse session from a second device. The second device is joined into the co-browse session as a guest. Specifically, the first user (e.g., customer) may be conducting a secondary communication with a second user (e.g., agent) associated with the second device, and wherein the second user is initiating a co-browse session in order to help the first user navigate through the content. In that secondary communication, the first user identifier may be transferred. In the meantime, the second device is implemented to initiate a co-browse session.

At 390, the method includes exposing the co-browsing functionality in the content with an icon comprising the co-browse session identifier. When the icon is activated at the first device, the first web browser is joined into the co-browse session as a host. Previously, the second web browser had already joined the co-browse session upon initiation. When the co-browse session is established between the first web browser and the second web browser through a co-browse communication server, the content at the first web browser is delivered to the second web browser via the co-browse communication server.

TABLE 1

LISTING OF CLAIMS

1. A method for co-browsing, comprising;
establishing a first communication session between a first web browser of first device and a content provider over a network to deliver content to said first web browser from said content provider, wherein said first device is associated with a first user, wherein said content comprises embedded co-browsing functionality;
establishing a second communication session between a second device and a co-browse communication server to initiate a co-browse session, wherein said co-browse session comprises a co-browse session identifier, wherein said second device acts as a guest in said co-browse session;
sending a user identifier associated with said first user and said co-browse session identifier from said second device to said content provider;
exposing said co-browsing functionality in said content delivered to said first web browser with an icon comprising said co-browse session identifier, such that when said icon is activated at said first device, said first web browser is joined into said co-browse session;
establishing said co-browse session between said first web browser of said first device as a host and a second web browser of said second device, such that said content at said first web browser is delivered to said second web browser of said second device via said co-browse communication server through said co-browse session.
2. The method of Claim 1, wherein said establishing said co-browse session further comprises:
determining that said icon is activated at said first device;
establishing a third communication session between said first web browser and said co-browse communication server;
delivering said co-browse session identifier from said first web browser to said co-browse communication server in a request to join said co-browse session; and
joining said first web browser into said co-browse session based on said co-browse session identifier.
3. The method of Claim 1, wherein said exposing said co-browsing functionality further comprises:
identifying said first communication session at said content provider based on said user identifier;
accessing said content; and
enabling said co-browsing functionality in said content.

TABLE 1-continued

LISTING OF CLAIMS

4. The method of Claim 3, further comprising:
setting a flag that enables said co-browse functionality;
generating a new page for said content that is enabled with said co-browse functionality, wherein said new page comprises said icon; and
delivering said new page of said content to said first web browser.
5. The method of Claim 1, further comprising:
establishing a fourth communication session between said first user and a second user of said second device; and
communicating said user identifier of said first user to said second user through said fourth communication session.
6. The method of Claim 5, wherein said fourth communication session comprises voice communication.
7. The method of Claim 1, wherein said establishing a second communication session further comprises:
sending said co-browse session identifier from said co-browse communication server to said second web browser.
8. The method of Claim 1, wherein said establishing a first communication session further comprises:
authenticating said first user in a log-in process; and
associating said first user with said user identifier.
9. The method of Claim 1, further comprising:
joining said second web browser into said co-browse session based on said co-browse session identifier.
10. The method of Claim 1, wherein said co-browse functionality in said content provides for:
accessing a document object model (DOM) of said content delivered to said first web browser; and
sending said DOM to said co-browse communication server for delivery to said second web browser.
11. The method of Claim 10, further comprising:
recognizing changes to said DOM in an updated DOM at one of said first and second web browsers; and
sending said updated DOM to said co-browse communication server for delivery to the other of said first and second web browsers.
12. The method of Claim 1, further comprising:
enabling a rules engine at said first device to filter sensitive information, such that said sensitive information is not delivered to said co-browse communication server.
13. A system for co-browsing, comprising:
a first device comprising a first web browser configured for communicating over a network, wherein said first device is associated with a first user;
a content provider providing content comprising embedded co-browsing functionality;
a first communication session between said first web browser of said first device and said content provider over said network configured to deliver content to said first web browser from said content provider;
a second device comprising a second web browser for communicating over said network;
a co-browse communication server (CS) configured to provide a co-browse session comprising a co-browse session identifier;
a second communication session between said second device and said co-browse communication server to initiate said co-browse session, wherein said second device acts as a guest in said co-browse session; and
wherein said co-browse session is established between said first web browser of said first device as a host and a second web browser of said second device through said embedded co-browsing functionality, such that said content at said first web browser is delivered to said second web browser of said second device via said co-browse communication server through said co-browse session.
14. The system of Claim 13, further comprising:
a third communication session between said second device and said content provider for delivering said user identifier and said co-browse session identifier to said content provider;
wherein said co-browsing functionality in said content delivered to said first web browser is exposed with an icon comprising said co-browse session identifier, such that when said icon is activated at said first device, said first web browser is joined into said co-browse session;
15. The system of Claim 13, wherein said first web browser is configured to deliver said co-browse session identifier to said co-browse communication server in a request to join said co-browse session, and wherein said co-browse communication server is configured to join said first web browser in said co-browse session based on said session identifier.
16. The system of Claim 13, wherein said content provider is configured to identify said first communication session comprising said content based on said user identifier, and to enable said co-browsing functionality in said content.
17. The system of Claim 13, further comprising:
a fourth communication session between said first user and a second user of said second device, wherein said fourth communication session is configured for communicating said user identifier to said second user.

TABLE 1-continued

LISTING OF CLAIMS

18. The system of Claim 13, wherein said co-browse communication server is configured to send said co-browse session identifier to said second web browser for purposes of initiating said co-browse session.
19. The system of Claim 13, further comprising:
a rules engine at said first device configured to filter sensitive information, such that said sensitive information is prevented from being delivered to said co-browse communication server.
20. A method for co-browsing, comprising:
establishing a first communication session between a content provider and a first web browser of a first device over a network, wherein said first device is associated with a first user;
delivering content to said first web browser, wherein said content comprises embedded co-browsing functionality;
receiving a first user identifier associated with said first user and a co-browse session identifier of a co-browse session from a second device, wherein said second device is joined into said co-browse session as a guest; and
exposing said co-browsing functionality in said content with an icon comprising said co-browse session identifier, such that when said icon is activated at said first device, said first web browser is joined into said co-browse session as a host, wherein when said co-browse session is established between said first web browser and said second web browser through a co-browse communication server said content at said first web browser is delivered to said second web browser via said co-browse communication server.
21. The method of Claim 20, further comprising:
identifying said first communication session based on said user identifier;
accessing said content; and
enabling said co-browsing functionality in said content.

Figure 4:
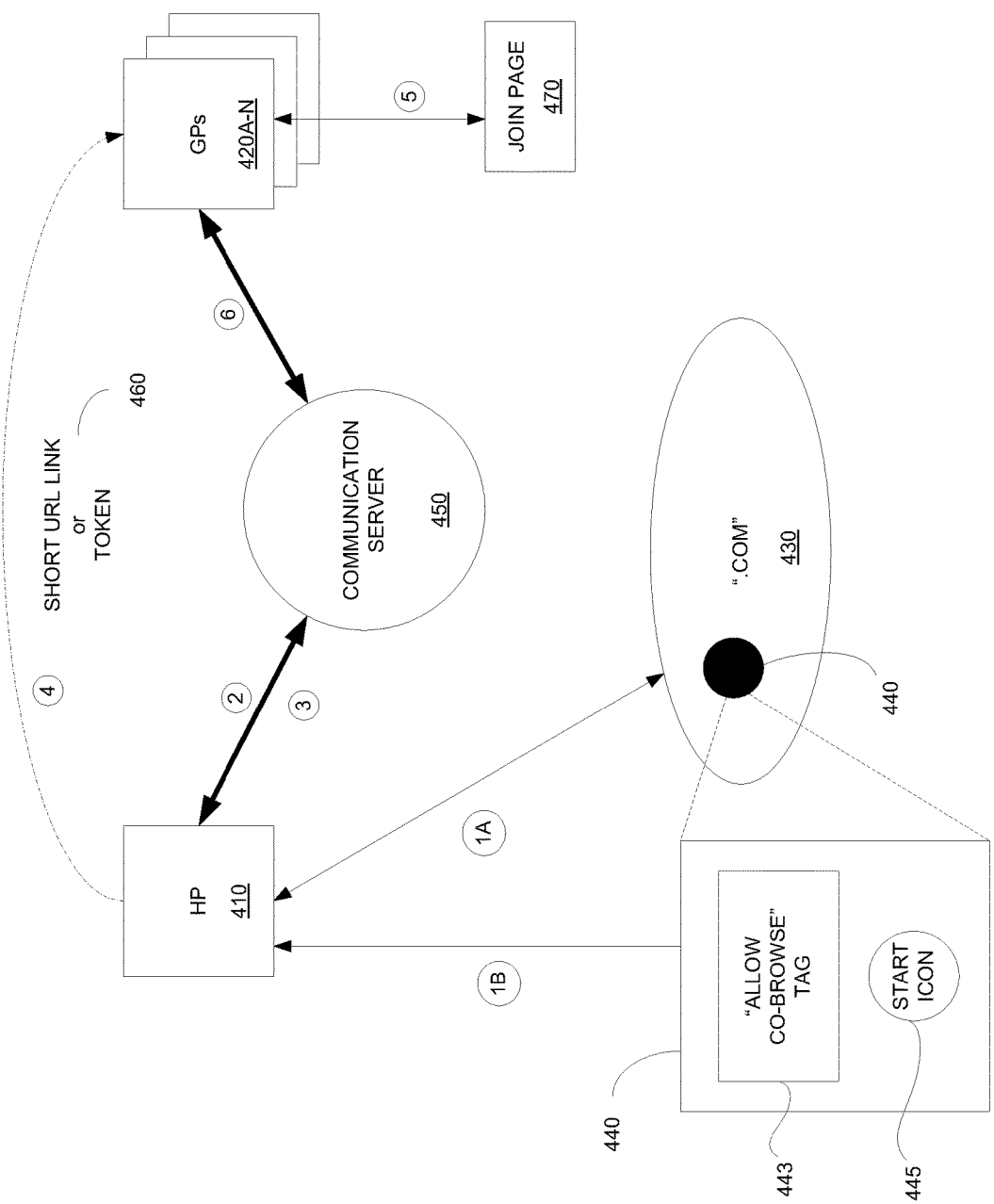
FIG. 4 is an illustration of an information flow diagram showing the flow of information through a co-browse system that is capable of establishing a co-browse session between two parties (e.g., two or more consumers) through co-browsing functionality embedded in content provided by a content provider, in accordance with one embodiment of the present disclosure.

B2C2C Architecture with Co-Browsing Functionality Embedded in Online Content, and where the Host Initiates the Co-Browsing Session FIG. 4 is an illustration of an information flow diagram showing the flow of information through a co-browse system 400 that is capable of establishing a co-browse session between at least two parties (e.g., two or more participants) through co-browsing functionality embedded in content provided by a content provider, in accordance with one embodiment of the present disclosure. Co-browsing allows participants to simultaneously view the content within a co-browse session. In addition, because the co-browsing functionality is hosted by the content provider, none of the participants are required to have a co-browse extension on their respective browsers.

System 400 illustrates a B2CC2C architecture that provides for co-browsing of online content by at least two participants. The online content is delivered by a content provider (referred to as ".com") through a server 430 to a host participant HP 410. A co-browsing session may be established between a web browser running on a computer associated with the host participant HP 410, and a web browser running on a computer system associated with a guest participant GP 420A. Additional guest participants GP 420A-N may also be included in the co-browse session. In particular, participant HP 410 acts as a host in the co-browse session, initiates the co-browse session, and invites guest participants GP 420A-N into the co-browse session. The co-browsing session allows the browsers of participating parties to display substantially the same online content (e.g., an html web page), with some modifications for co-browsing depending on whether the participant is the host or the guest.

A possible use case illustrating the implementation of the B2C2C architecture providing a co-browse session may be online shopping by two or participants at a .com website of a content provider, wherein the co-browse session is supported by the content provider. For example, host participant HP 410 may be shopping on the .com website, and finds an appealing item. Participant HP 410 may want some input on the item by a friend GP 420A, almost as if the two participants were shopping together at a store in a local shopping mall. As such, host participant HP 410 selects the co-browsing feature on the website, as provided by the content provider, initiates the co-browse session, and invites guest participant GP 420A. After participant GP 420A joins, both participants are able to view the consent through a shared shopping experience provided by the co-browse session. Additional guests may be similarly jointed into the same co-browse session.

As shown in FIG. 4, a communication session is established between host participant HP 410 and the .com server 430 in step 1A, wherein server 430 instantiates the .com website and provides content (including code, images, video, or other content related to a web page). For instance, the browser at HP 410 is able to receive content from .com server 430, wherein the content includes embedded co-browsing functionality (e.g., html, JavaScript, cascading style sheets [CSS], etc.) that is enabled upon activation. Access to the content is accomplished through some communication network (not shown), such as, the internet. The co-browsing functionality is enabled at the appropriate time to facilitate co-browsing between the host participant HP 410 and the guest participants GP 420A-N.

The co-browse functionality is embedded within the content delivered to the browser at host participant HP 410 at step 1A. For example, the co-browse functionality is embedded in the content through an "allow co-browse" tag 443 (e.g., html, JavaScript, CSS, etc.). In one embodiment, the co-browse functionality is provided on every page of the content. For example, the content provider supports a co-browsing feature that allows any visitor to its website to initiate a co-browse session and invite one or more guests to join the session. The co-browse session enables a shared shopping experience between the participants. Because the co-browsing functionality is provided within the content, a co-browse session continues to exist as long as the participants are accessing the content from .com server 430 through their respective browsers. That is, no browser extension providing co-browsing functionality is necessary to be downloaded at the participants computer systems, since the co-browsing functionality is embedded into the content provided by the .com server 430.

A start icon or widget 445 may also be provided within the delivered content. In one embodiment, the start icon is provided on every page of the content provided by server 430. For example, the start icon 445 may include a hyperlink. At step 2, by activating icon 445, the web browser at host participant HP 410 is directed to the co-browse communication server 450 through the hyperlink in order to initiate a co-browse session, and join the browser at host participant HP 410 into the co-browse session. For instance, host participant HP 410 would like to share an item with an invited guest through a co-browse session. Once the co-browse session is established, the browser at host participant HP 410 is coupled to the communication server 450 through a communication network.

The co-browse session is associated with a co-browse session identifier that is generated by the communication server 450 once the co-browse session is established. At step 3, the co-browse communication server sends the co-browse session identifier back to the host participant HP 410. In that manner, host HP 410 can invite one or more guests by passing the co-browse session identifier to the guests.

At step 4, an invitation to join the co-browse session is delivered to one or more guest participants GP 420A-N. The invitation includes the co-browse session identifier or some information that can be mapped back to the session identifier. The invitation may be in the form of an electronic communication (e.g., email, chat, voice, etc.) that includes or allows for the transfer of the co-browse session identifier or corresponding information. For example, an invitation to co-browse may be delivered via email, wherein the email may include a link to a URL to establish the co-browsing session. In another implementation, an invitation to co-browse is delivered via copying a URL. That is, the URL is delivered, and the guest goes to that URL to initiate the co-browse session. In still another implementation, the invitation to co-browse is delivered via a message on a social networking platform. In some cases, the invitation may be some analog form of communication, such as a written note including a token, wherein the token is used to authenticate and/or identify the co-browse session.

For example, the co-browse session identifier may be included in a hyperlink 460 (e.g., short URL) that is included in the invitation. When the hyperlink is selected by a guest participant, the corresponding browser is directed to the co-browse communication server 450. Because the hyperlink includes the co-browse session identifier, the co-browse communication server is able to join the corresponding browser into the proper co-browse session.

In another embodiment, the co-browse session identifier is linked with or is included within a token (e.g., password and/or session identifier indicating which co-browse session is to be used). The token may be delivered via any mechanism, such as, the phone, email, etc. along with instructions for using that token to join the co-browse session. For instance, the guest presents the token to the back end server that is facilitating the co-browse session. The token is used to identify the session and the host computer. As such, the token may be communicated through any means, such as through voice communication in step 4. For example, the host participant HP 410 may call guest participant GP 420A and through voice communication transfer the token to guest GP 420A. In addition, the host HP 410 may give instructions on how to join the co-browse session, such as accessing a web site with a join page, and inputting the token into the join page 470. For example, at step 5, when the token is presented at a co-browse join page 470, the corresponding browser (e.g., of a guest participant GP 420A) is directed or redirected to the co-browse communication server 450 and joined into the associated co-browse session. In one implementation, the join page 470 is located at the website supported by .com server 430. In another implementation, the join page 470 is provided by the communication server 450. In still another implementation, the join page may be located at a separate network location.

In still another embodiment, the invitation to join the co-browse session may be through a co-browsing social networking platform or any third party social networking platform (e.g., Facebook, Twitter, Skype, etc.), wherein both parties are logged into the corresponding social network. In this case, the host participant HP 410 may invite guest participant GP 420A through come communication channel provided by the social network. As an illustration, the host participant may send a message (e.g., post, mail, etc.) to the home or message page of the guest GP 420A, wherein the message includes the link to join the co-browse session. In another illustration, the host participant HP 410 and the guest may be chatting through the social networking site.

The co-browse session is fully established when the guest GP 420A joins, such that the co-browse session couples the browser of the host participant HP 410 to the co-browse communication server 450 through a communication network, and couples the web browser at the guest GP 420A to the co-browse communication server 450 through the network.

The co-browse communication server 450 acts as an interface between the web browsers for host HP 410 and guest GP 420A, and allows the two browsers to display substantially the same online content (e.g., an html web page). For example, in the co-browse session whatever online content provided to the browser for host HP 410 by .com server 430 is forwarded to the communication server 450, and then delivered to the browser for the guest GP 420A. Further, control (e.g., cursor click) or navigation information (e.g., cursor position and interaction) depending on priority and/or rules settings as implemented at host HP 410 is relayed to the communication server 450, and then to the guest GP 420A.

In this manner, the guest GP 420A is insulated from the .com server 430, and relays all communication to or with .com server 430 through the communication server 450 and the host HP 410. For example, any action on the online content as interfaced by the browser for the guest GP 420A is not directly delivered to the .com server 430, and instead is delivered to the communication server 250, which then delivers the interaction instruction to the browser at the host HP 410. At that point, the browser at host HP 410 will deliver the interaction instruction to the .com server 430. In that manner, the instruction comes from the browser at host HP 410, even though it originated from the browser at guest GP 420A. Further, any control (e.g., cursor click) or navigation information provided by the guest GP 420A is relayed to the communication server 450 and then to the host HP 410 depending on priority and/or rules settings as implemented at the guest GP 420A.

Again, if the communication server 450 malfunctions, then the communication session between the browser of host participant HP 410 and the .com server 450 is unaffected. That is, only the link between the browser at guest GP 420A and the communication server 450 will be affected (e.g., experience lower performance, terminate, etc.).

Figure 5:
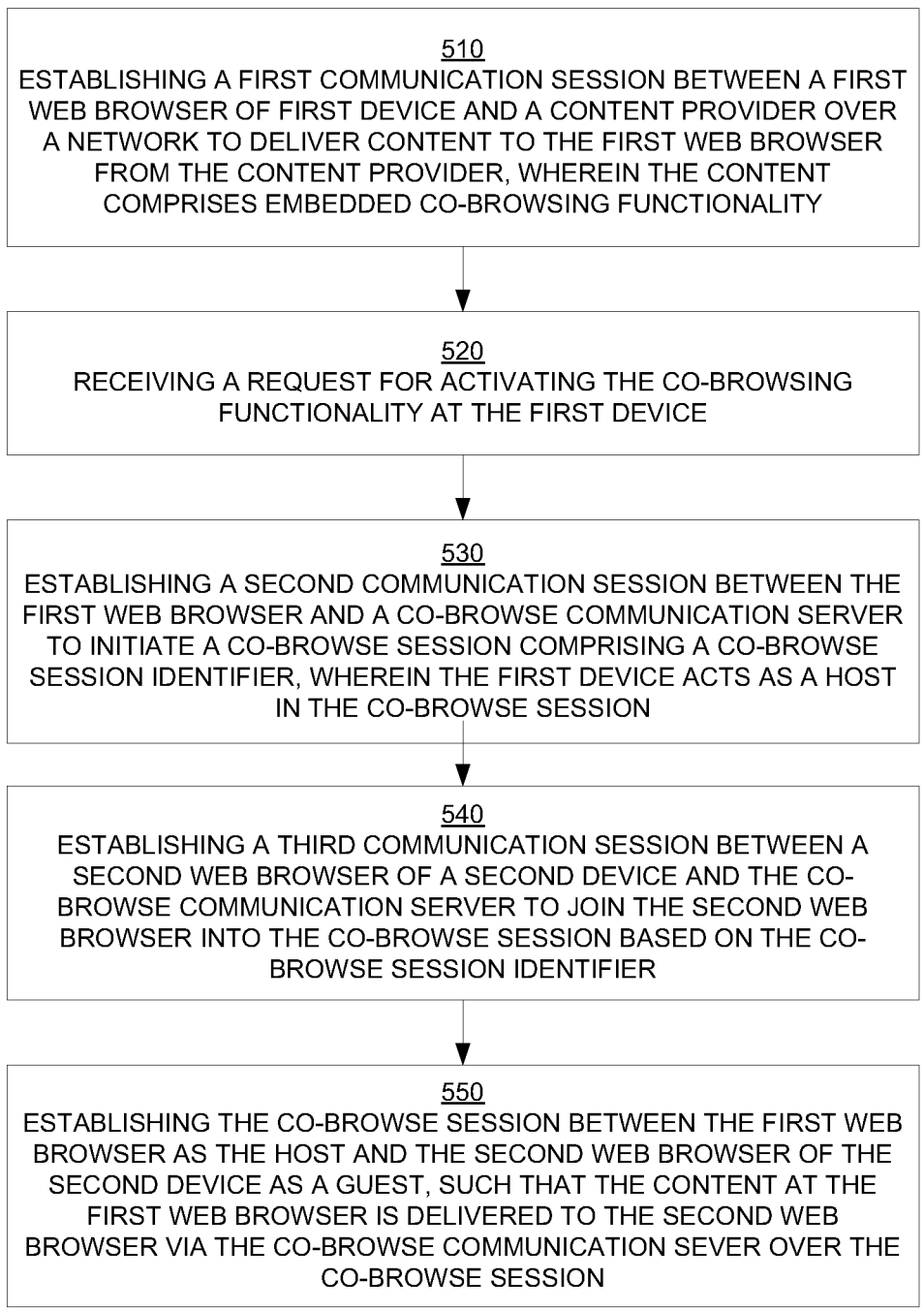
FIG. 5 is a flow diagram illustrating steps in a method for providing co-browsing between two or more parties through co-browsing functionality embedded in content provided by a content provider, in accordance with one embodiment of the present disclosure.

FIG. 5 is a flow diagram illustrating steps in a method for providing co-browsing between two or more parties through co-browsing functionality embedded in content provided by a content provider, in accordance with one embodiment of the present disclosure. In other embodiments, all or portions of the method outlined in flow diagram 500 may be implemented as a computer-implemented method; or implemented as instructions within a computer system including a processor and memory configured to execute the instructions; or implemented as computer/processor executable instructions stored on a non-transitory computer-readable storage medium. Some or all of the operations performed in diagram 500 are implementable within apparatus 100 and/or co-browse system 400 of FIG. 4.

At 510, the method includes establishing a first communication session between a first web browser of first device (e.g., host participant) and a content provider over a network. The session is established to deliver content to the first web browser from the content provider, wherein the content includes embedded co-browsing functionality (e.g., html, JavaScript, CSS, etc.).

At 520, the method includes receiving a request for activating the co-browsing functionality at the first device. For example, the request may be in the form of a hyperlink displayable within or overlaid the content, that when selected initiates the joining to the co-browse session. In one embodiment, the hyperlink is instantiated within an icon. Prior to activation, the co-browsing functionality as delivered with the content runs in the background but is not implemented. As previously described, a host participant at the first device may want to have a shared web experience (e.g., shopping), and initiates the co-browsing session by selecting a co-browsing start icon provided with the content.

After determining that the start co-browse session icon is activated at the first device, at 530 the method includes establishing a second communication session between the first web browser and the co-browse communication server. As such, the co-browse communication server initiates and/or establishes the co-browse session including a co-browse session identifier and joins the first web browser into the co-browse session. In this embodiment, the first device acts as the host in the co-browse session, wherein the host maintains the original browser session with the content provider to receive content, and wherein the host initiates the co-browse session.

In addition, after the co-browse session is established, the co-browse communication server delivers the co-browse session identifier to the first device (e.g., host participant). In that manner, the session identifier can be used to join other guest participants. As previously described, an invitation that includes some mapping reference to the co-browse session identifier is delivered to guests in order to join web browsers associated with those guests to the co-browse session. The invitation is in the form of an electronic communication (e.g., email, chat, voice, etc.) that allows for the transfer of the co-browse session identifier, or some other information used to map back to the session identifier. In some cases, the invitation may be some analog form of communication, such as a written note including a token.

For example, the invitation may include a hyperlink (e.g., short URL) that includes the session identifier, wherein the hyperlink directs the corresponding browser to the co-browse communication server in order to join that browser to the co-browse session associated with the co-browse session identifier. That is, the co-browse communication server generates the hyperlink including some reference to the co-browse session identifier, that when delivered to and selected by a second device is used to join the second device into the co-browse session. For example, the hyperlink for joining the co-browse session may be delivered within an email sent to or accessible by the second device, or within a chat window conducted between the first and second devices.

In other embodiments, a token is used to join the co-browse session through any join page. For example, a fourth communication session may be established between the second web browser and the join page. The token is entered into the join page, wherein the token may be a password that indicates which co-browse session is to be used. When the token is authenticated, the corresponding browser is directed to the co-browse communication server (e.g., through the third communication session), and is joined into the proper co-browse session based on information contained in the token. In still other embodiments, the invitation to join the co-browse session is made through a messaging or communication feature of a social network platform (e.g., co-browsing social network, or third party social network [e.g., Facebook, Twitter, Skype, etc.]).

Once the invitation to join the co-browse session is accepted by the guest (activate the join link, or enter token in join page), at 540 the method includes establishing a third communication session between a second web browser of a second device (e.g., associated with the guest) and the co-browse communication server to send a request to join the associated co-browse session, and subsequently to join the second web browser into the co-browse session based on the co-browse session identifier. Because the request includes some reference to the co-browse session identifier, as previously described, the communication server is able to identify the proper co-browse session, and join the second web browser into the co-browse session.

At 550, the method includes establishing the co-browse session between the first web browser as the host and the second web browser of the second device as a guest, such that content at the first web browser is delivered to the second web browser via the co-browse communication sever over the co-browse session. For example, a DOM (e.g., including html, JavaScript, CSS, etc.) of the content is accessed at the first web browser and delivered to the co-browse communication server for delivery to the second web browser. The co-browse session allows the two browsers to display substantially the same DOM, with some modifications for co-browsing depending on control and priority information as defined for the host or the guest. For instance, changes to the DOM are recognized at one of the web browsers of the first and second devices. The changes may include events (e.g., mouse/cursor movement, mouse clicks, etc.). These changes are updated in the DOM, wherein the updated DOM is delivered to the other web server through the co-browse communication server.

TABLE 2

| LISTING OF CLAIMS |
| --- |
| 1. A method for co-browsing, comprising; establishing a first communication session between a first web browser of first device and a content provider over a network to deliver content to said first web browser |

TABLE 2-continued

LISTING OF CLAIMS from said content provider, wherein said content comprises embedded co-browsing functionality;
receiving a request for activating said co-browsing functionality at said first device;
establishing a second communication session between said first web browser and a co-browse communication server to initiate a co-browse session, wherein said co-browse session comprises a co-browse session identifier, wherein said first device acts as a host in said co-browse session;
establishing a third communication session between a second web browser of a second device and said co-browse communication server to join said second web browser into said co-browse session based on said co-browse session identifier;
establishing said co-browse session between said first web browser as said host and said second web browser of said second device as a guest, such that said content at said first web browser is delivered to said second web browser via said co-browse communication sever over said co-browse session.

2. The method of Claim 1, wherein said receiving a request for activating said co-browsing functionality further comprises:
providing an icon for activating said co-browsing functionality within or overlaid said content at said first device.

3. The method of Claim 2, wherein said establishing a second communication session comprises:
determining that said icon is activated at said first device; and
initiating said co-browse session; and
joining said first web browser into said co-browse session.

4. The method of Claim 1, wherein said co-browse functionality in said content provides for:
accessing a document object model (DOM) of said content delivered to said first web browser; and
sending said DOM to said co-browse communication server for delivery to said second web browser.

5. The method of Claim 4, further comprising:
recognizing changes to said DOM in an updated DOM at one of said first and second web browsers; and
sending said updated DOM to said co-browse communication server for delivery to the other of said first and second web browsers.

6. The method of Claim 1, further comprising:
receiving a link comprising said co-browse session identifier at said first web browser from said co-browse communication server, wherein said link when activated directs a corresponding browser to establish communication with said co-browse communication server to join said co-browse session; and
delivering said link to said second device.

7. The method of Claim 6, wherein said delivering said link comprises:
pasting said link into a chat conducted between said first device and said second device.

8. The method of Claim 6, wherein said delivering said link comprises:
including said link in an electronic message that is delivered from said first device to said second device.

9. The method of Claim 6, wherein said establishing a third communication session comprises:
activating said link at said second device.

10. The method of Claim 1, wherein said establishing a third communication session comprises:
establishing a fourth communication session between said second web browser and a join page;
entering a token in said join page, wherein said token comprises said co-browse session identifier; and
directing said second web browser to said co-browse communication server over said third communication session to join said second web browser into said co-browse session based on said token.

11. A system for co-browsing, comprising:
a first device comprising a first web browser configured for communicating over a network;
a content provider providing content comprising embedded co-browsing functionality;
a first communication session between said first web browser and said content provider over said network to deliver said content to said first web browser from said content provider;
a second device comprising a second web browser for communicating over said network;
a co-browse communication server configured to provide a co-browse session comprising a co-browse session identifier;
a second communication session established between said first web browser and said co-browse communication server to initiate said co-browse session comprising a co-browse session identifier, wherein said second communication session is established in response to receiving a request for activating said co-browse functionality at said first device, wherein said first device acts as a host in said co-browse session;
a third communication session established between said second web browser and

TABLE 2-continued

LISTING OF CLAIMS said co-browse communication server to join said second web browser into said co-browse session based on said co-browse session identifier;
said co-browse session established between said first web browser as said host and said second web browser of said second device as a guest, such that said content at said first web browser is delivered to said second web browser via said co-browse communication sever over said co-browse session.
12. The system of Claim 11, wherein said content provider is configured to provide an icon for activating said co-browsing functionality that is overlaid said content at said first device.
13. The system of Claim 12, wherein first device is configured to determine that said icon is activated, and initiate said co-browse session through said second communication session to join said first web browser into said co-browse session.
14. The system of Claim 11, wherein said first device is configured to access a document object model (DOM) of said content, and send said DOM to said co-browse communication server for delivery to said second web browser.
15. The system of Claim 14, wherein said first device is configure to recognize changes to said DOM in an updated DOM, and send said updated DOM to said co-browse communication server for delivery to said second web browser.
16. The system of Claim 14, wherein said second device is configure to recognize changes to said DOM in an updated DOM, and send said updated DOM to said co-browse communication server for delivery to said first web browser.
17. The system of Claim 11, wherein said first web browser is configured to receive a link comprising said co-browse session identifier from said co-browse communication server and deliver said link to said second device, wherein said link when activated directs a corresponding browser to establish communication with said co-browse communication server to join said co-browse session.
18. The system of Claim 17, wherein said first web browser is configured to paste said link into a chat conducted between said first device and said second device, or include said link in an electronic message that is delivered from said first device to said second device.
19. The system of Claim 17, wherein said second web browser is configured to establish a fourth communication session between said second web browser and a join page, enter a token into said join page, wherein said token comprises said co-browse session identifier, and direct said second web browser to said co-browse communication server to join said second web browser into said co-browse session based on said token.
20. A method for co-browsing, comprising:
establishing a first communication session between a content provider and a first web browser of a first device over a network;
delivering content to said first web browser, wherein said content comprises embedded co-browsing functionality;
exposing said co-browsing functionality in said content with an icon comprising said co-browse session identifier, such that when said icon is activated at said first device, said first web browser is joined into said co-browse session as a host, wherein said co-browse session is established between said first web browser and a second web browser of a second device through a co-browse communication server, and wherein said content at said first web browser is delivered to said second web browser via said co-browse communication server.

Figure 6:
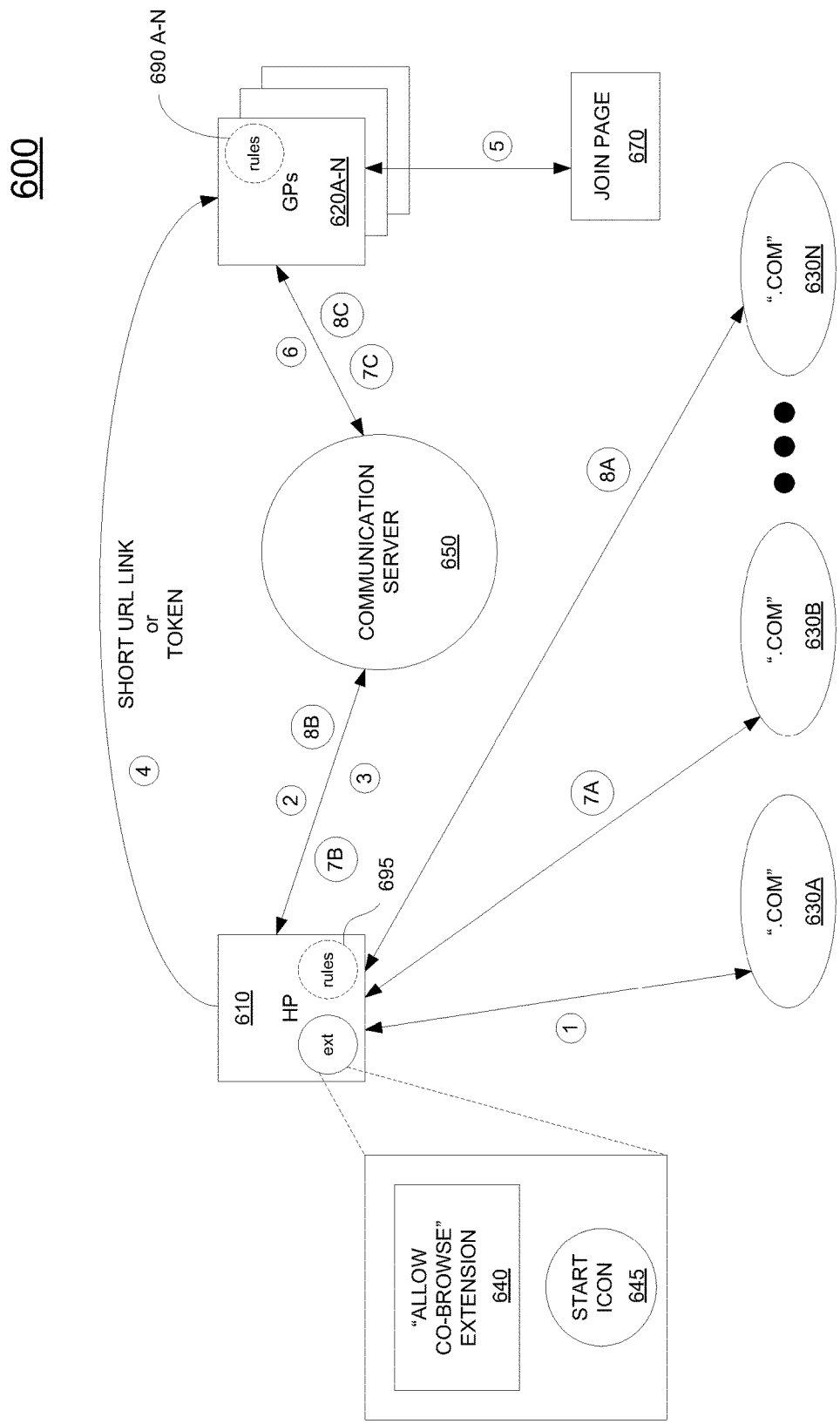
FIG. 6 is an illustration of an information flow diagram showing the flow of information through a co-browse system that is capable of establishing a co-browse session between two or more parties of multiple domains (e.g., web sites) through a co-browsing extension to a web browser, in accordance with one embodiment of the present disclosure.

C2C and B2C Architecture with Multi-Domain Co-Browsing Functionality Enabled Through a Web Browser Extension FIG. 6 is an illustration of an information flow diagram showing the flow of information through a co-browse system 600 that is capable of establishing a co-browse session between two or more parties accessing multiple domains (e.g., web sites) through a co-browsing extension to a web browser, in accordance with one embodiment of the present disclosure. Co-browsing allows participants to simultaneously view the content within a co-browse session.

System 600 illustrates a C2C and/or a B2C architecture that provides for co-browsing of online content by at least two participants. A co-browsing session may be established between a web browser running on a computer associated with the host participant HP 610, and a web browser running on a computer system associated with a guest participant GP 620A. Additional guest participants GP 620 B-N may also be included in the co-browse session. In particular, participant HP 610 acts as a host in the co-browse session, initiates the co-browse session, and invites guest participants GP 620 A-N into the co-browse session. The co-browsing session allows the browsers of participating parties to display substantially the same online content (e.g., an html web page), with some modifications for co-browsing depending on whether the participant is the host or the guest.

The extension architecture allows for multi-domain co-browsing. That is, because the co-browse functionality is provided as an extension 640 to the browser at the host participant HP 610, that functionality is implementable on any content from any content provider. As such, a co-browse session is able to distribute content from any content provider. For example, the host participant HP 610 may be viewing content from .com server 630 A-N within a browser. That content is also available to any guest participant GP 620 A-N through the co-browse session. As shown in FIG. 6, only the device associated with host participant HP-1 has the extension 640 for implementing co-browsing. In addition, to distribute the co-browse functionality to each of the guest participants GP 620A-N, the co-browsing functionality is added to the content and provided to the co-browse communication server 650 and to each of the guest participants GP 620 A-N through the co-browse session.

A possible use case illustrating the implementation of the C2C architecture providing a co-browse session is the shared experience of online shopping by two or more participants as previously introduced in the B2C2C embodiments, except in the C2C architecture multiple .com websites may be shared in the co-browse session. In the C2C architecture all the parties may not be connected with or employed by the businesses associated with the .com servers 630 A-N.

A possible use case illustrating the implementation of the B2C architecture providing a co-browse session involves an insurance company selling insurance to a customer. In the B2C case, the host participant HP 610 may be the agent of the insurance company. A guest participant GP 620A is the customer, wherein the agent is helping the customer select an insurance plan. The co-browse session allows the agent to help the customer navigate not only through the insurance company's web site (e.g., showing different insurance plans offered by the insurance company), but also allows the agent to show the customer information from other web sites that may be helpful in determining which plan to select. For instance, the agent may direct the customer in the co-browse session to a government website "healthcare.gov". The agent is then able to help the customer navigate through the healthcare.gov website in the co-browse session to determine what subsidy is available to the customer. In the co-browse session, the agent can now direct the customer back to the web site hosted by the insurance company to determine which health plan is best after applying the subsidy. After a health plan is selected, the agent is able to help the customer fill in the proper enrollment forms provided by the insurance company's website in the co-browse session.

As shown in FIG. 6, a communication session is established between host participant HP 610 and the .com server 630A in step 1, wherein server 630A instantiates the .com website and provides content (including code, images, video, or other content related to a web page). Access to the content is accomplished through some communication network (not shown), such as, the internet.

At some point, the host participant HP 610 decides to initiate a co-browse session. This may occur before, during, or after connecting to any content provider. For instance, the co-browse session may be established and running before the host participant HP 610 has accessed any online content. The co-browsing functionality may be implemented through an icon that is displayed by the browser with or without content. For instance, the start co-browse icon may be implemented through a co-browse toolbar or widget that is layered over the content, wherein the icon includes a link. As such, at step 2, after the icon is selected the web browser at the host participant HP 610 is directed to the co-browse communication server 650 in order to initiate a co-browse session, and join the browser at host HP 610 into the co-browse session. Once the co-browse session is established, the browser at host HP 610 is coupled to the communication server 650 through a communication network.

As previously described, the co-browse session is associated with a co-browse session identifier, that is generated by the co-browse communication server 650. At step 3, the co-browse communication server 650 sends the co-browse session identifier to host HP 610, wherein the session identifier can be used to join the co-browse session by any presenter (e.g., guest participants 620 A-N).

At step 4, an invitation to join the co-browse session is delivered to one or more guest participants GP 620 A-N. The invitation and the process for inviting the guest is similar to that previously described in relation to the B2C2C architecture. Specifically, the invitation contains the co-browse session identifier, or some information that maps back to the identifier. For example, the invitation may be in the form of an electronic communication (e.g., email, chat, voice, etc.), or may be in analog form (e.g., voice or note) that contains a token.

For example, the invitation may include a hyperlink (e.g., short URL) that includes the session identifier, wherein the hyperlink directs the corresponding browser to the co-browse communication server in order to join that browser to the co-browse session associated with the co-browse session identifier. In another example, the invention to join may be presented with a token. For example, the token may include a password which when presented to the proper authority (e.g., a join page 670 at step 5) will direct the corresponding browser to the co-browse communication server to join that browser into the co-browse session based on information contained in the token. The token may be distributed through any means, such as when the host participant phones the guest (e.g., associated with GP 620A) and communicates the token particulars (e.g., password). In addition, the host may verbally tell the guest the network address of the join page. In one implementation, the join page 670 is located at the website supported by .com server 630, or is provided by co-browse communication server 650, or may be located at a separate network location. In still other embodiments, the invitation to join the co-browse session is made through a messaging or communication feature of a social network platform (e.g., co-browsing social network, or third party social network [e.g., Facebook, Twitter, Skype, etc.]), wherein both participants are logged into the social network platform. For example, the hyperlink and/or token along with invitation details may be presented to a guest by the host through the communication channel provided by the social network (e.g., post, mail, chat, messaging, etc.).

The co-browse session is fully established when the guest 620A joins the co-browse session at step 6. As such, the co-browse communication server 650 is coupled to the web browser of the host participant 610, and the web browser of the guest participant 620A through a communication network (not shown). Additional guests may be added through a similar joining process. The co-browse communication server 650 acts as an interface between the web browsers for host HP 610 and guests GP 620 A-N, and allows the browsers to display substantially the same online content (e.g., an html web page). For example, in the co-browse session whatever online content provided to the browser for host HP 610 by .com server 630 is forwarded to the communication server 650, and then delivered to the browsers for the guests GP A-N. Further, control (e.g., cursor click) or navigation information (e.g., cursor position and interaction) depending on priority and/or rules settings as implemented at host HP 610 is relayed to the communication server 650, and then to the guests GP A-N.

Further, any interaction by host HP 610 with the online content is communicated directly with the .com website (e.g., 630A). That interaction is then updated and delivered back to the browser of the hot HP 610 (e.g., in the form of a new page), updated and/or delivered to the communication server 650 facilitating the co-browsing, and then updated and/or delivered to the browser at guest 620A.

In this manner, each of the guests GP 620A-N is insulated from any of the .com servers 630 A-N, and relays all communication to or with .com servers 630 A-N through the communication server 650 and the host HP 610. As such, the guests GP 620 A-N are able to interface with the online content via the host participant HP 610. For example, any action on the online content by the browser for the guest GP 610A is not directly delivered to .com server 630A, and instead is delivered to the co-browse communication server 650, which then delivers the interaction instruction to the browser at the host HP 610. At that point, the browser at host HP 610 will deliver the interaction instruction to the .com server 630A. Further, any control (e.g., cursor click) or navigation information provided by the guest GP 620A is relayed to the communication server 650 and then to the host HP 610 depending on priority and/or rules settings as implemented at the guest GP 620A.

Because the extension providing co-browsing functionality is on the browser of the host participant 610, the .com servers 630 A-N are unaware of the co-browse session between the host 610 and the guests 620 A-N. Also, the browsers at the guest participants GP 620 A-N are not required to install an extension on their browser, because they receive the co-browsing functionality through the co-browsing session (e.g., html, JavaScript, CSS, etc. that is layered on top of the content).

Additionally, the extension allows for multi-domain co-browsing. In particular, during the co-browse session content from a second website may be accessed. For example, at step 7A, the content from .com server 630B is accessed by the browser at host HP 610. That content is then delivered to the co-browse communication server 650 in step 7B, which is then delivered to at least one of the guest participants 620 A-N at step 7C in the co-browse session. In one implementation, the first browser session with .com server 630A is still open (e.g., on another tab), while the second browser session with .com server 630B is being conducted. Additional windows to other content may be implemented. For example, at step 8A, the content from .com server 630N is accessed by the browser at host HP 610. That content is delivered to the co-browse communication server 650 at step 8B, which is then delivered to at least one of the guests 620 A-N at step 8C in the co-browse session.

Again, if the co-browse communication server 650 malfunctions, then the communication session between the browser of host HP 610 and the .com server 650 is unaffected. That is, only the link between the browser at any of the guests GP 620A-N and the communication server 650 will be affected (e.g., experience lower performance, terminate, etc.).

In another implementation, host HP 610 is an agent of the business associated with the .com server 630A. In the example previously introduced, host HP 610 may be associated with an agent of an insurance company. Because the host HP 610 associated with the agent acts as the host in the co-browse session, and is helping the guest participant (e.g., guest 620A) navigate through one or more websites provided by .com servers 630 A-N, one or more rules engines 690 A-N at the guest participants GP 620 A-N and rules engine 695 at the host participant 610 are implemented to ensure sensitive information provided by the guests are not accessible by the agent. For example, the agent may help the agent fill out a form available on the insurance company's website provided by .com server 630A. The form may include private information, such as, banking account numbers, or social security numbers. The rules engines 690 A-N and 695 help to prevent the agent from accessing that private information.

For example, the rules engine 690A at the guest participant 620A is able to identify sensitive information, and mark that information. The sensitive information that is marked is then delivered to the co-browse communication server, for ultimate delivery back to the .com server 630A. this may occur when the guest/customer wants to submit the information when enrolling in a healthcare plan. When that sensitive information is passed to the host HP 610 in the co-browse session, the rules engine 695 at the host identifies the sensitive information through its markings, and performs additional actions on that information to prevent the agent from accessing (e.g., viewing) that sensitive information. For instance, the sensitive information may be masked (e.g., marked with asterisks "*s" in place of text). As such, the unmasked version of the sensitive information can still be delivered back to the .com server 630A for processing.

Figure 7:
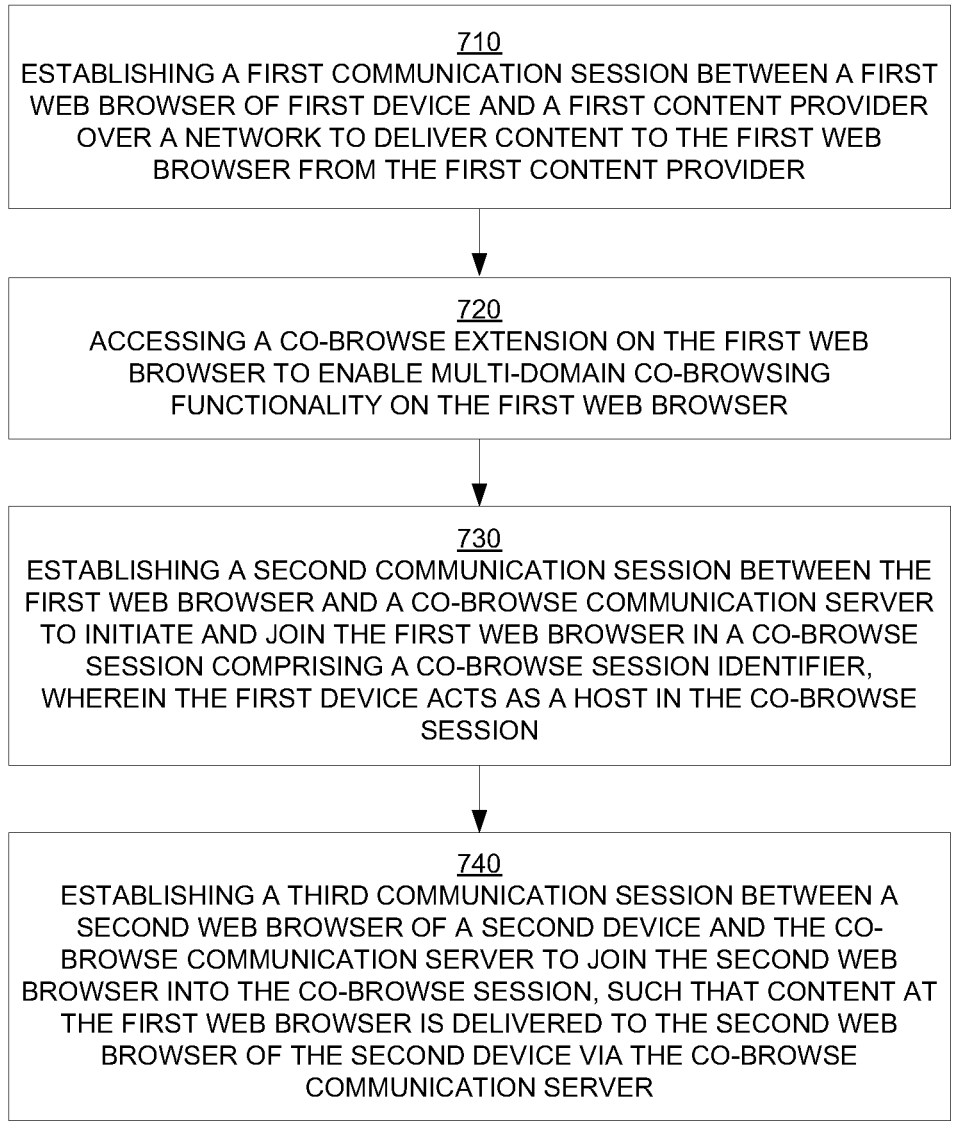
FIG. 7 is a flow diagram illustrating steps in a method for establishing a co-browse session between two or more parties of multiple domains (e.g., web sites) through a co-browsing extension to a web browser, in accordance with one embodiment of the present disclosure.

FIG. 7 is a flow diagram 700 illustrating steps in a method for establishing a co-browse session between two or more parties of multiple domains (e.g., web sites) through a co-browsing extension to a web browser, in accordance with one embodiment of the present disclosure. In other embodiments, all or portions of the method outlined in flow diagram 700 may be implemented as a computer-implemented method; or implemented as instructions within a computer system including a processor and memory configured to execute the instructions; or implemented as computer/processor executable instructions stored on a non-transitory computer-readable storage medium. Some or all of the operations performed in diagram 700 are implementable within apparatus 100 and/or co-browse system 600 of FIG. 6.

At 710, the method includes establishing a first communication session between a first web browser of first device (e.g., host participant) and a content provider over a network. The session is established to deliver content to the first web browser.

At 720, the method includes accessing a co-browse extension on the first web browser to enable multi-domain co-browsing functionality. The co-browsing functionality may be enabled responsive to a request to initiate co-browsing at the first device. As previously described, the extension allows the host to deliver multi-domain content, from one or more content providers, to one or more guest participants in a co-browse session. That is, because the co-browsing functionality is not tied to particular content from a corresponding content server, and is instead located at the host participant, any content received by the host participant may be distributed through the co-browse session to one or more guest participants.

For example, the co-browse extension may be accessed through a start co-browsing hyperlink displayable within or overlaid the content provided by the browser at the host, that when selected initiates a co-browse session. In particular, after determining that the icon was activated making a request to initiate a co-browse session, at 730 the method includes establishing a second communication session between the first web browser and a co-browse communication server to initiate and join said first web browser in a co-browse session. The co-browse session comprises a co-browse session identifier, wherein said first device acts as a host in said co-browse session.

After the co-browse session is established, the co-browse communication server delivers the co-browse session identifier to the first device (e.g., host) so that the first device is able to send out invitations to one or more guest participants (e.g., a guess participant at the second web server). The session identifier may be included as a link or token, or any other form capable of making an association back to the co-browse session and the co-browse communication server for joining the co-browse session. As previously described, the invitation can be in the form of a electronic communication (e.g., email, chat, voice, etc.) that allows for the transfer of the co-browse session identifier, or some other information (e.g., hyperlink) for mapping back to the session identifier. For example, the invitation may be sent via email or within a chat window and include a short hyperlink (e.g., short URL) that when activated directs the corresponding browser to the co-browse communication server to join that browser into the appropriate co-browse session using the associated co-browse session identifier. In another embodiment, the invitation can be in the form of a token that is delivered through some secondary communication channel. For example, the token may be a password that is communicated through a phone to a guest along with instructions to enter the token into an addressable join page in order to join the co-browse session. As such, when the token is authenticated through the join page, the corresponding browser is directed to the co-browse communication server through another communication session over the network. In addition, the browser is joined into the co-browse session based on the session identifier and/or information contained in the token.

Once the invitation is accepted, at 740, the method includes establishing a third communication session between a second web browser of a second device and the co-browse communication server to establish the co-browse session and join the second web browser into the session. For example, a request to join is delivered to the co-browse communication server (e.g., through activation of the co-browse hyperlink), wherein the request includes some reference to the co-browse session identifier, as previously described. Based on the session identifier, the co-browse communication server is able to identify the proper co-browse session and join the second web browser into the co-browse session.

As a result, the co-browse session between the first web browser as the host, and the second web browser of the second device as the guest is established. In the co-browse session, content at the first web browser is delivered to the second web browser of the second device via the co-browse communication server. In this embodiment, the first device acts as the host in the co-browse session, wherein the host maintains the original browser session with the content provider to receive content, and wherein the host initiates the co-browse session. For example, a DOM (e.g., including html, JavaScript, CSS, etc.) of the content is accessed at the first web browser and delivered to the co-browse communication server for delivery to the second web browser. The co-browse session allows the two browsers to display substantially the same DOM, with some modifications for co-browsing depending on control and priority information as defined for the host or the guest. For instance, changes to the DOM are recognized at one of the web browsers of the first and second devices. The changes may include events (e.g., mouse/cursor movement, mouse clicks, etc.). These changes are updated in the DOM, wherein the updated DOM is delivered to the other web server through the co-browse communication server.

Additionally, the host participant may access content from multiple domains of one or more content providers (e.g., .com servers). Because the co-browsing extension is located on the host participant, the co-browse session will support the distribution of content from the multiple domains through the co-browse session. For example, when accessing additional content, a fourth communication session between the first web browser (e.g., host) of the first device and a second content provider is established over the network. The second content provider delvers second content to the first web browser. Further, the second content is delivered from the first web browser to the co-browse communication server, which then forwards it to the second web browser of the second device (e.g., at the guest) in the co-browse session. In one implementation, the first browser session with first content provider remains open (e.g., on another tab), while the second browser session with the second content provider is established and opened. Additional browser sessions with additional content from additional content providers may also be distributed through the co-browse session.

TABLE 3

LISTING OF CLAIMS

1. A method for co-browsing between multiple parties, comprising:
establishing a first communication session between a first web browser of first device and a first content provider over a network to deliver content to said first web browser from said first content provider;
accessing a co-browse extension on said first web browser to enable multi-domain co-browsing functionality on said first web browser;
establishing a second communication session between said first web browser and a co-browse communication server to initiate and join said first web browser in a co-browse session, wherein said co-browse session comprises a co-browse session identifier, wherein said first device acts as a host in said co-browse session;
establishing a third communication session between a second web browser of a second device and said co-browse communication server to join said second web browser into said co-browse session, such that content at said first web browser is delivered to said second web browser of said second device via said co-browse communication server.
2. The method of Claim 1, wherein said accessing a co-browse extension further comprises:
responsive to request at said first device, enabling said co-browsing functionality at said first device.
3. The method of Claim 2, further comprising:
determining that a co-browse icon has been activated on said first device.
4. The method of Claim 1, further comprising:
receiving a link comprising said co-browse session identifier at said first web browser from said co-browse communication server, wherein said link when activated directs a corresponding browser to establish communication with said co-browse communication server to join said co-browse session.
5. The method of claim 4, further comprising:
delivering said link to said second device.

TABLE 3-continued

LISTING OF CLAIMS

6. The method of Claim 5, wherein said delivering said link comprises:
pasting said link into a chat conducted between said first device and said second device.
7. The method of Claim 5, wherein said delivering said link comprises:
including said link in a message that is delivered from said first device to said second device.
8. The method of Claim 4, wherein said establishing a third communication session comprises:
activating said link at said second device.
9. The method of Claim 1, wherein said establishing a third communication session comprises:
establishing a fourth communication session between said second web browser and a join page;
entering a token in said join page, wherein said token comprises said co-browse session identifier;
directing said second web browser to said co-browse communication server over said third communication session to join said second web browser into said co-browse session based on said token.
10. The method of Claim 1, further comprising:
establishing a fourth communication session between said first web browser of said first device and a second content provider over said network to deliver second content to said first web browser from said second content provider; and
delivering said second content from said first web browser to said second web browser of said second device via said co-browse communication server in said co-browse session.
11. The method of Claim 1, further comprising:
establishing a first rules engine at said second device to identify sensitive information, and mask said sensitive information; and
establishing a second rules engine at said first device to identify said sensitive information that is masked.
12. A system for co-browsing between multiple parties, comprising:
a first communication session established between a first web browser of first device and a first content provider over a network to deliver content to said first web browser from said first content provider;
a co-browse extension accessible on said first web browser that enables multi-domain co-browsing functionality on said first web browser;
a second communication session established between said first web browser and a co-browse communication server to initiate and join said first web browser in a co-browse session, wherein said co-browse session comprises a co-browse session identifier, wherein said first device acts as a host in said co-browse session; and
a third communication session between a second web browser of a second device and said co-browse communication server to join said second web browser into said co-browse session, such that content at said first web browser is delivered to said second web browser of said second device via said co-browse communication server.
13. The system of Claim 12, further comprising:
an icon at said first device that when activated enables said co-browsing functionality at said first device.
14. The system of Claim 12, further comprising:
a link comprising said co-browse session identifier delivered to said first web browser from said co-browse communication server, wherein said link when activated directs a corresponding browser to establish communication with said co-browse communication server to join said co-browse session.
15. The system of Claim 12, wherein said link is delivered to said second device.
16. The system of Claim 15, further comprising:
a chat conducted between said first device and said second device, wherein said link is pasted into said chat.
17. The system of Claim 15, further comprising:
a message including said link that is delivered from said first device to said second device.
18. The system of Claim 15, further comprising:
a fourth communication session established between said second web browser and a join page; and
a token entered into said join page, wherein said token comprises said co-browse session identifier, and wherein said second web browser is directed to said co-browse communication server over said third communication session to join said second web browser into said co-browse session based on said token.
19. The system of Claim 12, further comprising:
a fourth communication session established between said first web browser of said first device and a second content provider over said network to deliver second content to said first web browser from said second content provider, wherein said second content is delivered from said first web browser to said second web browser of said second device via said co-browse communication server in said co-browse session.
20. The system of Claim 12, further comprising:
a first rules engine at said second device to identify sensitive information, and mask said sensitive information; and
a second rules engine at said first device to identify said sensitive information that is masked.

Co-Browsing in the Mobile Environment

Figure 8:
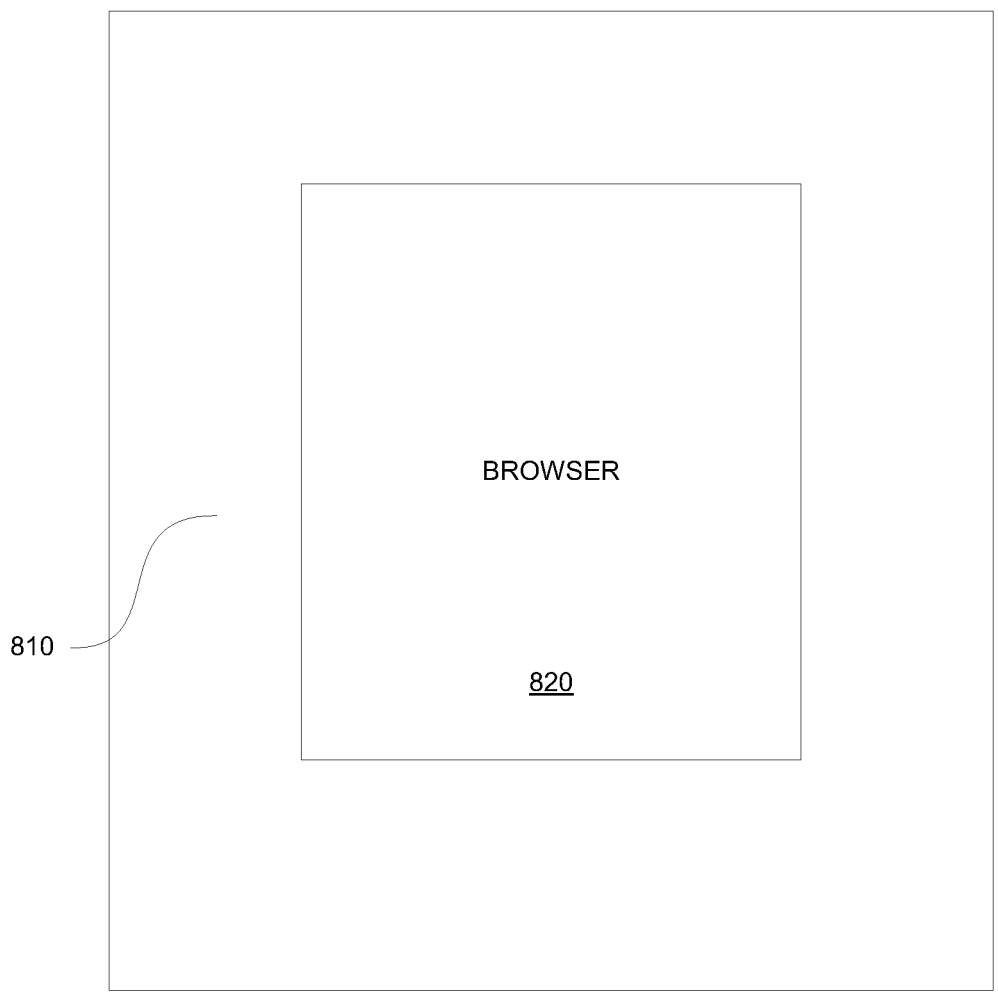
FIG. 8 is an illustration of the implementation of co-browsing through a mobile application, in accordance with one embodiment of the invention.

FIG. 8 is an illustration of the implementation of co-browsing through a mobile application 800, in accordance with one embodiment of the invention. As shown, the mobile application includes co-browsing functionality 810, and browser functionality 820 for a mobile device. The mobile application is invoked by a user to access information (e.g., websites, data, etc.) over a network using the browser functionality. In addition, the mobile application is invoked to establish and/or participate in a co-browse session. In that manner, a co-browsing session is established not exactly through a browser or through browser extensions, but through an interaction with a mobile application. For instance, the application is manipulating the web page inside the browser, or providing co-browsing instructions to the browser. This extends the concept of co-browsing to mobile applications.

In one embodiment, the browser functionality is provided through a library of functionalities that are selected and used within the mobile application 800. For instance, the library may contain one or more browser applications suitable for use within the mobile application 800. In that manner, the browser functionality 820 is selectable within the library for use within the mobile application 800.

In one implementation, the browser application may include a native browser application that is provided by the manufacture of the mobile device. That is, the co-browsing functionality is paired with the native browsing application.

In another case, the browser application may be a third party (e.g., enterprise) browser application. For instance, a major retailer may want to provide co-browsing as a feature for its mobile users. In that case, the major retailer could provide a co-browsing functionality within its own mobile shopping application. In another case, a corporation (e.g., an insurance company or banking establishment) may want to include a co-browsing feature within their mobile application, so that an agent of the corporation may be able to help a user navigate through the mobile application. For example, a user may be using the mobile application of an insurance company to file a car accident claim. A co-browse session may be established and include an agent of the insurance company and the user, wherein the agent can help the user fill out an accident claim form provided by the website of the insurance company when making the claim. As an example of a multiple domain co-browsing session, the agent can help the user navigate through a mapping domain to find the geographic location of the accident, and then fill out that information on the accident claim form.

In still another case, the browser application may be associated with the co-browsing functionality 810, wherein a user who loads the mobile application 800 for purposes of co-browsing, also can automatically access the corresponding browser feature or functionality 820. Additional features may be provided within the mobile application 800 in this implementation, such as a chat channel, an offers engine providing offers to the user, and other functionalities that complement a co-browsing session.

A method for co-browsing in a mobile environment is described, in accordance with one embodiment of the present disclosure. The method includes providing a mobile application executable on a mobile device, wherein the mobile application comprises a co-browsing functionality; and wrapping browser functionality with the mobile application, such that web browsing is enabled when executing the co-browsing functionality. For example, the browser functionality may be accessed within a library of functionalities, such that the method includes providing a library of functionalities comprising a first functionality enabling browser functionality; and calling the first functionality within the mobile application. In one embodiment, the mobile application comprises a third party enterprise, such as an insurance company, or retailer, etc.

TABLE 4

LISTING OF CLAIMS

1. A method for co-browsing in a mobile environment, comprising:
providing a mobile application executable on a mobile device, wherein said mobile application comprises a co-browsing functionality; and
wrapping browser functionality with the mobile application, such that web browsing is enabled when executing said co-browsing functionality.
2. The method of Claim 1, wherein said wrapping browser functionality with the mobile application comprises:
providing a library of functionalities comprising a first functionality enabling browser functionality; and
calling said first functionality within said mobile application.
3. The method of Claim 1, wherein said mobile application is associated with an third party enterprise.

Pointer Differentiation Between Multiple Parties of a Co-Browse Session

Figure 9:
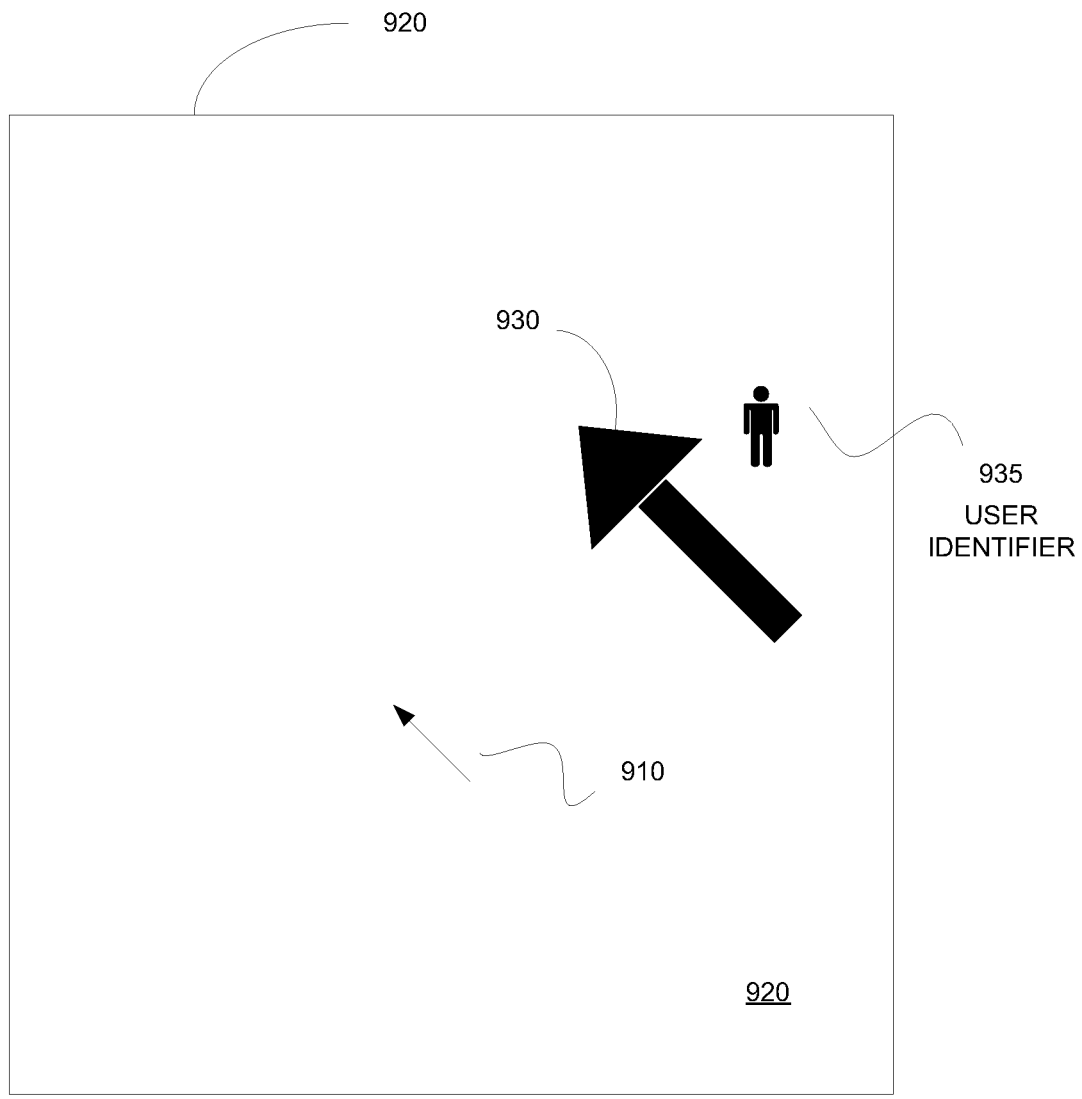
FIG. 9 is an illustration of a plurality of pointers in a co-browse session, each of which is distinct and unique from the other pointers for immediate identification, in accordance with one embodiment of the invention.

FIG. 9 is a diagram illustrating a window 920 of a display of a host of a co-browsing session, wherein the co-browsing sessions are facilitated through any of the previously described co-browsing methods and architectures. For example, in a co-browsing session, the host establishes a co-browsing session with a guest. Window 920 is associated with the host user, and includes pointer 910 that is controlled by the operating system of the host device. In one embodiment, the pointer 910 of a local device (e.g., in this case the host) is not controlled by the co-browse communication server and does not have any identifying information, and appears without modification on the display of the host device.

On the other hand, as shown in FIG. 9, when in a co-browse session, the pointer 930 for the guest is displayed differently from the pointer 910 of the host. For instance, the guest pointer 930 may be larger, or of different shape, etc. Also, more than one guest pointer may be supported, wherein the co-browse session allows separate and independent control of each of the pointers at the same time. In particular, at each local device, the co-browse functionality (e.g., enabled through browser extension or through code contained within the html content of the displayed web page) is configured to query the local browser for pointer position of the local user. As such, each of the pointers may be moving throughout the co-browse session at the same time, and their presentation on corresponding displays are updated periodically by the co-browse communication server receiving and distributing pointer information. On a local display, because each of the pointers is visually different from other pointers, this allows the participants of the co-browse session to more easily track the different pointers from the different users.

In addition, with additional identifying information associated with a particular pointer, the user (e.g., host) is able to immediately identify which participant is controlling a particular pointer within a co-browse session. This is extremely helpful in distinguishing different pointers when more than two participants are associated with a co-browse session. For example, the guest pointer 930 may have identification information displayed adjacent to pointer 930. The identifying information may include a name, an avatar, an actual user image, etc. Also, a user identifier may be shown. Other identification information associated with the guest may be supported.

Furthermore, other types of information may be displayed in association with the guest cursor 930. For instance, the idle time of the pointer may be displayed. In that manner, the user is able to determine whether the guest is participating in the co-browse session.

In one embodiment, the position of the guest pointer is updated to reflect movement of the guest pointer, as controlled by the guest on his or her corresponding display. That is, if the guest moves the guest pointer 930 in relation to online content, that movement and relationship between the pointer 930 and the online content is also reflected in window 920. That is, the movement of the guest pointer 930 is updated, so that the host is able to see what actions the guest is making. For example, the co-browse functionality of a particular device is constantly querying the browser for pointer information (e.g., location), and delivering that pointer location information to the co-browse communication server which distributes to all the participants in the co-browse session.

In another implementation, when the guest cursor 930 is inactive for a period of time, the cursor is removed from the view of the host. That is, it is removed from window 920. The cursor 930 reappears after the guest re-activates the cursor on his or her corresponding display.

In another embodiment, the display for the guest is similarly configured. That is, the cursors are displayed differently for both the guest and the host. Also identification information for the host is now displayed next to the host cursor that is being viewed by the guest.

In one embodiment, a method of displaying multiple pointers in a co-browsing environment is described. The method includes establishing a co-browse session between a host device and one or more guest devices, and displaying a local pointer on the local device. The local pointer is controlled by the local operating system. The method includes displaying a remote pointer on the local device (e.g., display), wherein the remote pointer is associated with a device remote from the local device. For example, if the local device is associated with a host, then the remote device is associated with a guest. Conversely, if the local device is associated with a guest, then the remote device is associated with the host or another guest. Also, the remote pointer includes one or more features distinguishing the remote pointer from the local pointer.

In one embodiment, the remote pointer is generated through a communication server facilitating said co-browse session. That is, information associated with the remote pointer (e.g., pointer location, associated user, avatar, etc.) is gathered by the co-browse communication server and then distributed to all participants in the co-browse session.

TABLE 5

LISTING OF CLAIMS

1. A method of displaying multiple pointers in a co-browsing environment, comprising:
establishing a co-browse session between a host device and one or more guest devices;
on a local device, displaying a local pointer; and
on said local device, displaying a remote pointer, wherein said remote pointer is associated with a device remote from said local device, and wherein said remote pointer includes one or more features distinguishing said remote pointer from said local pointer.
2. The method of Claim 1, further comprising:
controlling said local pointer by a local operating system.
3. The method of Claim 2, wherein said local pointer is associated with a host.
4. The method of claim 2, wherein said local pointer is associated with a guest.
5. The method of Claim 1, wherein said local pointer is controlled by a local operating system.
6. The method of Claim 1, further comprising:
generating said remote pointer through a communication server facilitating said co-browse session.
7. The method of Claim 1, further comprising:
providing identifying information adjacent to said remote pointer.
8. The method of Claim 7, wherein said identifying information comprises a name.
9. The method of Claim 7, wherein said identifying information comprises an avatar.
10. The method of Claim 1, further comprising:
tracking location information on a display of said remote pointer; and
removing said remote pointer from being displayed on said local device when said remote pointer remains static for a period of time.

Co-Browser Widget

Figure 10:
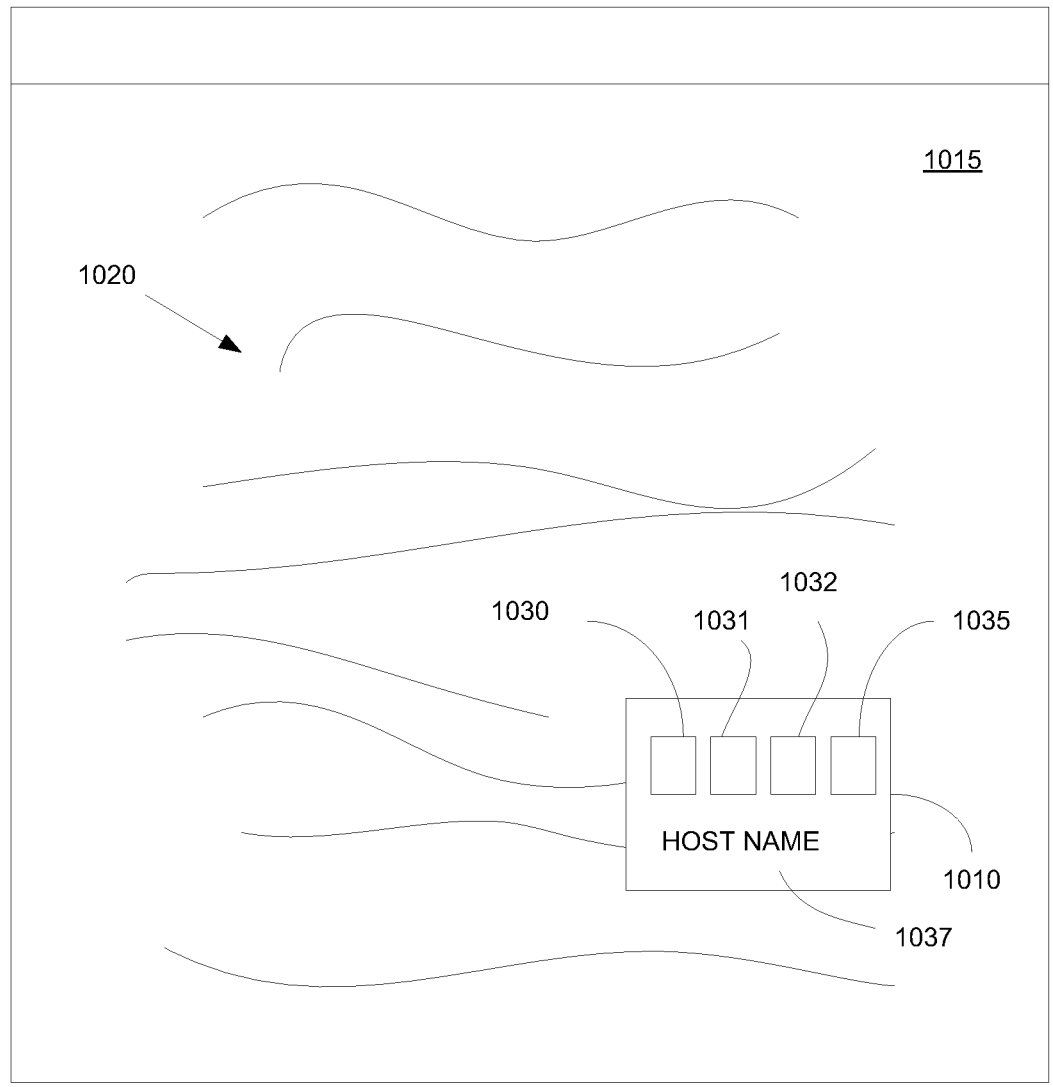
FIG. 10 are illustrations of a co-browse widget that is layered over or within the content provided by a co-browsing session at displays for a host and a guest, wherein each corresponding widget provides control over the co-browse session, in accordance with one embodiment of the invention.

FIG. 10 is an illustration of a window 1000 showing co-browse session between a host and guest, in accordance with one embodiment of the invention. The window 100 may be associated with either the host or the guest in the co-browse session. As shown in FIG. 10, a widget or user interface (UI) 1010 may be displayed in association with the content 1020 of the co-browse session in window 1015. In one embodiment, the UI 1010 is overlaid the content 1015, or displayed in a manner that is easily identifiable by the user. In still another embodiment, UI 1010 is movable within window 1015.

In one embodiment, the UI 1010 identifies the associated participant (e.g., host). For example, a user name 1037 (e.g., host name) may be shown, or other identifying information, such as an avatar or image of the user.

Moreover, the UI 1010 provides interfaces that are used to control a co-browsing session. For instance, UI 1010 provides one or more icons or interfaces that are used to establish settings, provide modes, provide goto links, provide identification, provide identifiers, provide logos, and provide a number of other action items. UI 1010 may be different for different classification of users within a co-browse session. For instance, a host UI 1010 may include an invite interface/widget/icon used to invite guests, whereas a guest UI 1010 would not include the invite interface/widget/icon.

In one case, the UI 1010 includes an interface 1030 that is used to initiate a co-browse session and invite guests into the co-browse session by allowing the host to identify the guest. In that case, the interface 1030 is also used to identify the communication method (email, chat, messaging over a social network platform, etc.) to be used to relay the co-browsing initiation information (e.g., session key) from the host to the guest.

In one example, a method is described for inviting a guest into a co-browse session, wherein the guest is logged into a network. In particular, on the host side, within the browser, a small extension is installed to enable co-browsing via the communication server facilitating co-browsing, and invite one or more guests that are logged into a network. The log-in may be on any supported and verifiable website, such as, a third party social network, or an insurance company network, or even the website/service that provides co-browsing services. For example, both the host and the guest are logged into the network supporting the co-browsing, and as such, both are identified to each other. In the case of a guest that is logged into a third party social networking site, the host is able to select a friend, invite that friend through the third party social network communications platform (e.g., Facebook message on that friend's wall), and establish a co-browsing session upon acceptance of the invite. More particularly, the extension provides for the display of a small co-browsing widget, for example. In order to commence co-browsing, the host first logs into the system. The host then enters a guest identification field. Since the guest is logged in, an identification of the guest can be found using the guest's log-in information. Once selected, a small message with session number is displayed on the guest's computer display (e.g., through a messaging board) and through the network upon which the guest is logged-in. When the session number is selected, the co-browsing session is established.

In another example, a method for establishing a co-browse session is described, wherein the guest is not logged into any site identifiable by the co-browse session, in accordance with one embodiment of the present disclosure. On the host side, within the browser, a small extension is installed to enable co-browsing via the co-browse communication server facilitating the co-browsing session, as previously described. In another implementation, the functionality is provided at the .com website, as previously described. This extension provides for the display of a small co-browsing widget. In order to commence co-browsing, the user or host first logs into the system. To invite another user to join, the host then enters information into a guest identification field selectable through interface 1030. The user can enter a guest identification and a communication method (e.g., email, token, etc.) to the guest. In one example, the guest is identified via an email address. The email address is used to send the guest an email which contains a session key. Upon the guest selecting the session key, a co-browsing session is started between the host and guest. The guest need not have the extension installed on the guest browser. Aside from email, the guest can be contacted via other communication methods, e.g., on-line chat, phone, etc. In addition, no native application need be installed on the guest computer.

In another example, interface 1031 is used to create a snapshot of the current co-browse session for storage into a history of snapshots, as will be described in relation to FIG. 11. In another example, interface 1032 is a "goto" action that is used to specify a new page of a new domain (e.g., website with new web address) for display in the co-browse session. In still another example, interface 1035 is used to terminate the current co-browse session. Still other functionality is supported, such as, a chat function to allow for communication between the host and the guest.

In one embodiment, the co-browse session is in a guest follows host mode, as activated by the UI. In this mode, the guest display will follow the host display. As such, wherever the cursor for the host goes in relation to the online content, the display on the guest will also show that content and the cursor for the host.

In another embodiment, the co-browse session is in a host follows guest mode, as active by the UI. In this mode, the host display will flow the guest display. As such, wherever the cursor for the guest goes in relation to the online content, the display on the host will also show that content and the cursor for the guest.

In still another embodiment, another mode allows for independent movement by each cursor. While the online content (e.g., html web page) is synchronized to both browsers on the host and the guest, the material on each page need not be synchronized. That is, the web page may be long, wherein a display is only able to show 10-40 percent of the page. In that case, the html code provides all the information to each browser for the entire page, however, each user may only want to display or interface with a small percentage of the page. For instance, the host may want to interact and display the top 20 percent of the web page. As such, the top 20 percent of the web page is displayed and the host's cursor is used to interface with that top 20 percent of the web page. On the other hand, the guest may want to interact and display the lower 20 percent of the web page. As such, the lower 20 percent of the web page is displayed and the guest's cursor is used to interface with that lower 20 percent. The material for both displays is different, though they are synchronized to the same web page or content.

TABLE 6

LISTING OF CLAIMS

1. A method of co-browsing, comprising:
providing a first user interface viewable on a display of a device; and
providing one or more widgets providing co-browsing functionalities.

TABLE 6-continued

LISTING OF CLAIMS

2. The method of Claim 1, providing a widget in said user interface on a host device enabling an initiation of a co-browse session between a host and at least one guest.
3. The method of Claim 1, further comprising:
providing said co-browse session between a host device and one or more guest devices.
4. The method of Claim 1, further comprising:
providing said user interface on a host device.
5. The method of Claim 1, further comprising:
establishing a co-browse session between a host device and a guest device; and providing a second user interface on a guest device, wherein said second user interface comprises one or more widgets providing co-browsing functionalities.
6. The method of Claim 5, wherein said first user interface comprises a first set of co-browsing functionalities, and said second user interface comprises a second set of co-browse functionalities that is different than said first set.
7. The method of Claim 1, further comprising:
displaying said user interface over content of a co-browse session.

History Buffer of Screen Shots with Embedded Links

Figure 11:
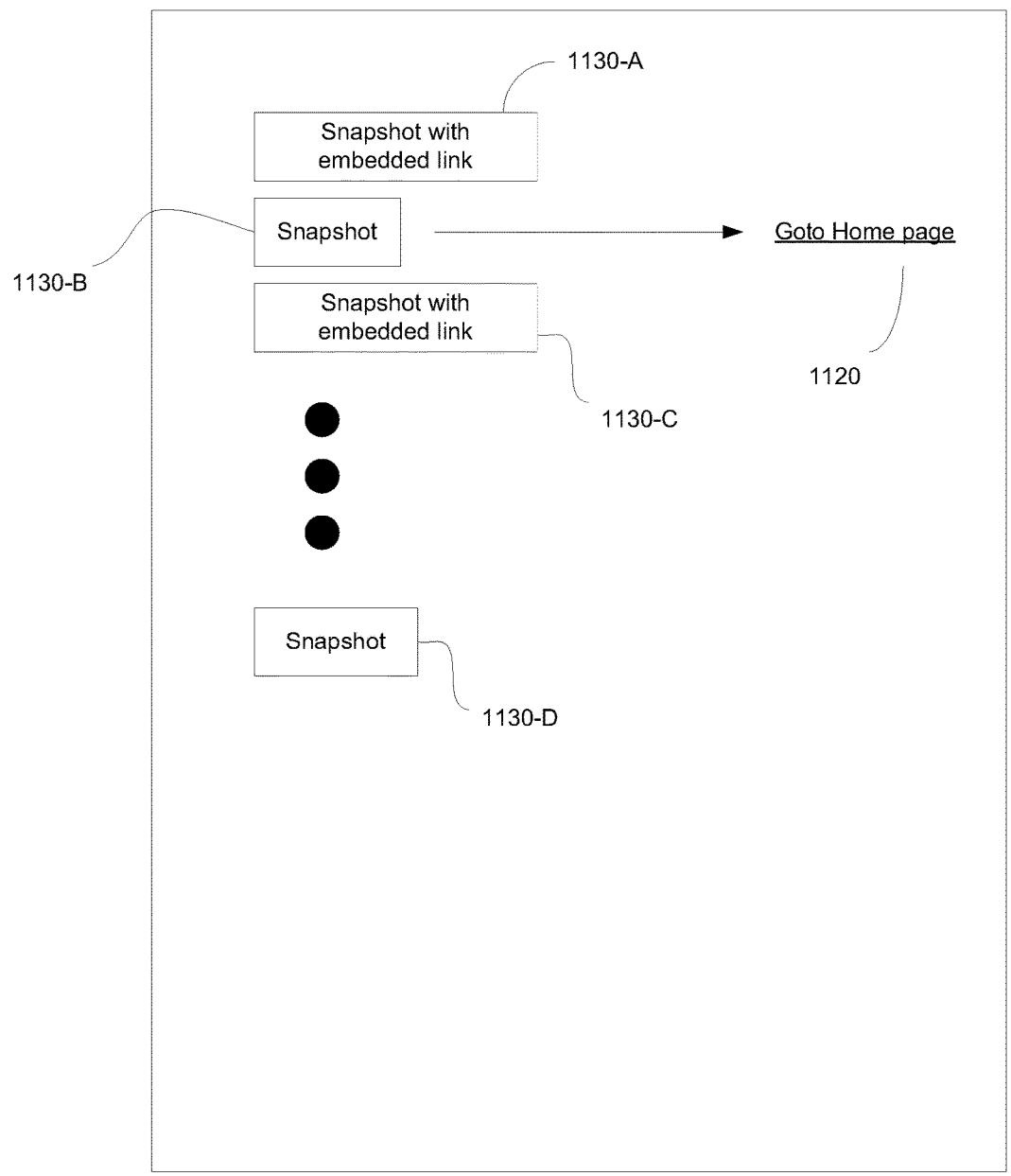
FIG. 11 is an illustration of a history of links or websites visited ruing a particular co-browse session, in accordance with one embodiment of the invention.

FIG. 11 is an illustration of a history of snapshots 1130 A-N of pages of one or more websites visited during a particular co-browse session, in accordance with one embodiment of the present disclosure. In embodiments, the history of snapshots is implemented either in a co-browsing session or in a regular session with one user. For example, during a co-browsing session or regular session, a logged in user can take a series of screen shots on their visited pages of one or more websites. A copy of the page 1130 A-N, in reduced form or full form, is stored in a history buffer. The stored snapshots are available to the user via an interface or window 1100 that shows the history of snapshots. An embedded link to the associated page may also be included and stored.

For instance, a co-browse session is established between a host and a guest. They visit N number of sites of one or more domains. When on any website, the host and/or guest may decide that they want to save a snapshot of a particular visit to a website. The snapshot functionality may be provided through an interface, or widget, or icon on the co-browse widget 1010 of FIG. 10, for example. As such, a snapshot of the page (e.g., html, JavaScript, CSS, etc.) is captured at a particular point in time. In one embodiment, the host takes the snapshot. In another embodiment, the guest may have a control that allows snapshots. In either case, this snapshot is stored in a history of snapshots in a repository associated with the host.

In one embodiment, the stored information may include a link to the corresponding page that is captured in the snapshot. For example, snapshot 1130-A includes an embedded link. The link will direct the browser to the address of the page captured in the snapshot. The information in the current page may be different than the information in the snapshot, though the address is the same. For example, the page may display an item within a retailer's website. The item may be discounted with a sale price in the snapshot that is stored, but is now displayed as a full price item in the current page.

In other embodiments, the stored information does not include an embedded link to the corresponding page captured in the snapshot. For example, snapshot 1130-B just includes the snapshot of the page, and does not include any link.

If a co-browsing session is started or ongoing with the guest, the host can select one of these images from the history buffer and the embedded link will take the host and the guest to that webpage employing a co-browsing session environment.

In still another embodiment, the screenshots can be annotated with additional information. For instance, a mark-up of the page is provided via a pen functionality.

In still another embodiment, a current page of the website is accessible. By clicking on the link 1120, the host and the guest are able to go to the home page of the web site associated with the online content contained in the snapshot accessible through link 1120.

TABLE 7

LISTING OF CLAIMS

1. A method of co-browsing, comprising:
establishing a co-browse session between a host device and one or more guest devices;
accessing a first page from a first website on said co-browse session;
capturing a first snapshot of said first page; and
storing said first snapshot in a repository associated with a user of said host device.
2. The method of Claim 1, wherein said user is logged into a network facilitating said co-browse session.
3. The method of Claim 1, further comprising:
accessing a second snapshot of a second page from said first website; and
storing said second snapshot in said repository.
4. The method of Claim 1,
accessing a second snapshot of a second page from a second website; and
storing said second snapshot in said repository.

TABLE 7-continued

LISTING OF CLAIMS

5. The method of Claim 1, further comprising:
accessing one or more snapshots captured in said co-browse session from said repository; and
displaying said one or more snapshots in a browser session.

---

Thus, according to embodiments of the present disclosure, systems and methods are described providing for co-browsing.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed:

1. A method for co-browsing, comprising:
establishing a first communication session between a first web browser of first device and a content provider over a network to deliver content to said first web browser from said content provider, wherein said content comprises embedded co-browsing functionality to host a co-browse session;
receiving a request for activating said co-browsing functionality at said first device;
establishing a second communication session between said first web browser and a co-browse communication server to initiate said co-browse session, wherein said co-browse session comprises a co-browse session identifier, priority information, and rules, wherein said first device acts as a host in said co-browse session;
establishing a third communication session between a second web browser of a second device and said co-browse communication server to join said second web browser into said co-browse session based on said co-browse session identifier;
identifying the first communication session by the content provider based on the previously received user identifier; and
establishing said co-browse session between said first web browser as said host and said second web browser of said second device as a guest, such that said content at said first web browser is delivered to said second web browser via said co-browse communication sever over said co-browse session by said embedded co-browsing functionality delivered to said first web browser in said content,
wherein said second device is insulated from receiving direct communication from said content provider, and
wherein said co-browse session allows the host and the guest to display online content from said content provider subject to modifications to a display of said second device for co-browsing depending on said priority information and said rules as defined for the host or the guest.

2. The method of claim 1, wherein said receiving a request for activating said co-browsing functionality further comprises: providing an icon for activating said co-browsing functionality within or overlaid said content at said first device.

3. The method of claim 2, wherein said establishing a second communication session comprises: determining that said icon is activated at said first device;
initiating said co-browse session; and
joining said first web browser into said co-browse session.

4. The method of claim 1, wherein said co-browse functionality in said content provides for:
accessing a document object model (DOM) of said content delivered to said first web browser; and
sending said DOM to said co-browse communication server for delivery to said second web browser.

5. The method of claim 4, further comprising:
recognizing changes to said DOM in an updated DOM at one of said first and second web browsers; and sending said updated DOM to said co-browse communication server for delivery to the other of said first and second web browsers.

6. The method of claim 1, further comprising:
receiving a link comprising said co-browse session identifier at said first web browser from said co-browse communication server, wherein said link when activated directs a corresponding browser to establish communication with said co-browse communication server to join said co-browse session; and
delivering said link to said second device.

7. The method of claim 6, wherein said delivering said link comprises: pasting said link into a chat conducted between said first device and said second device.

8. The method of claim 6, wherein said delivering said link comprises: including said link in an electronic message that is delivered from said first device to said second device.

9. The method of claim 6, wherein said establishing a third communication session comprises: activating said link at said second device.

10. The method of claim 1, wherein said establishing a third communication session comprises: establishing a fourth communication session between said second web browser and a join page;
entering a token in said join page, wherein said token comprises said co-browse session identifier; and
directing said second web browser to said co-browse communication server over said third communication session to join said second web browser into said co-browse session based on said token.

11. A system for co-browsing, comprising:
a first device comprising a first web browser configured for communicating over a network;
a content provider providing content comprising embedded co-browsing functionality;
a first communication session between said first web browser and said content provider over said network to deliver said content to said first web browser from said content provider;
a second device comprising a second web browser for communicating over said network;
a co-browse communication server configured to provide a co-browse session comprising a co-browse session identifier, priority information, and rules;
a second communication session established between said first web browser and said co-browse communication server to initiate said co-browse session comprising a co-browse session identifier, wherein said second communication session is established in response to receiving a request for activating said co-browse functionality at said first device, wherein said first device acts as a host in said co-browse session;
a third communication session established between said second web browser and said co-browse communication server to join said second web browser into said co-browse session based on said co-browse session identifier and based on the previously received user identifier;
said co-browse session established between said first web browser as said host and said second web browser of said second device as a guest, such that said content at said first web browser is delivered to said second web browser via said co-browse communication sever over said co-browse session by said embedded co-browsing functionality delivered to said first web browser in said content,
wherein said second device is insulated from receiving direct communication from said content provider, and
wherein said co-browse session allows the host and the guest to display online content from said content provider subject to modifications to a display of said second device for co-browsing depending on said priority information and said rules as defined for the host or the guest.

12. The system of claim 11, wherein said content provider is configured to provide an icon for activating said co-browsing functionality that is overlaid said content at said first device.

13. The system of claim 12, wherein first device is configured to determine that said icon is activated, and initiate said co-browse session through said second communication session to join said first web browser into said co-browse session.

14. The system of claim 11, wherein said first device is configured to access a document object model (DOM) of said content, and send said DOM to said co-browse communication server for delivery to said second web browser.

15. The system of claim 14, wherein said first device is configure to recognize changes to said DOM in an updated DOM, and send said updated DOM to said co-browse communication server for delivery to said second web browser.

16. The system of claim 14, wherein said second device is configure to recognize changes to said DOM in an updated DOM, and send said updated DOM to said co-browse communication server for delivery to said first web browser.

17. The system of claim 11, wherein said first web browser is configured to receive a link comprising said co-browse session identifier from said co-browse communication server and deliver said link to said second device, wherein said link when activated directs a corresponding browser to establish communication with said co-browse communication server to join said co-browse session.

18. The system of claim 17, wherein said first web browser is configured to paste said link into a chat conducted between said first device and said second device, or include said link in an electronic message that is delivered from said first device to said second device.

19. The system of claim 17, wherein said second web browser is configured to establish a fourth communication session between said second web browser and a join page, enter a token into said join page, wherein said token comprises said co-browse session identifier, and direct said second web browser to said co-browse communication server to join said second web browser into said co-browse session based on said token.

20. A method for co-browsing, comprising: establishing a first communication session between a content provider and a first web browser of a first device over a network;
delivering content to said first web browser, wherein said content comprises embedded co-browsing functionality, priority information, and rules;
exposing said co-browsing functionality in said content with an icon comprising said co-browse session identifier, such that when said icon is activated at said first device, said first web browser is joined into said co-browse session as a host, wherein said co-browse session is established between said first web browser and a second web browser of a second device through a co-browse communication server, and based on the previously received user identifier, and
wherein said content at said first web browser is delivered to said second web browser via said co-browse communication server by said embedded co-browsing functionality delivered to said first web browser in said content, wherein said second device is insulated from receiving direct communication from said content provider, and wherein said co-browse session allows the host and the guest to display online content from said content provider subject to modifications to a display of said second device for co-browsing depending on said priority information and said rules as defined for the host or the guest.

* * * * *